United States Patent
Barany et al.

(10) Patent No.: US 8,320,561 B2
(45) Date of Patent: Nov. 27, 2012

(54) KEY IDENTIFIER IN PACKET DATA CONVERGENCE PROTOCOL HEADER

(75) Inventors: Peter Anthony Barany, San Diego, CA (US); Arnaud Meylan, San Diego, CA (US); Sai Yiu Duncan Ho, San Diego, CA (US); Francesco Grilli, La Jolla, CA (US); Nathan Edward Tenny, Poway, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 12/186,430

(22) Filed: Aug. 5, 2008

(65) Prior Publication Data

US 2009/0041247 A1 Feb. 12, 2009

Related U.S. Application Data

(60) Provisional application No. 60/954,754, filed on Aug. 8, 2007.

(51) Int. Cl.
*H04L 9/00* (2006.01)
(52) U.S. Cl. ........................................................ 380/43
(58) Field of Classification Search .................. None
See application file for complete search history.

(56) References Cited

U.S. PATENT DOCUMENTS

| 2002/0066011 | A1* | 5/2002 | Vialen et al. | ................... 713/150 |
| 2005/0026607 | A1 | 2/2005 | Hwang et al. | |

FOREIGN PATENT DOCUMENTS

| JP | 2004515177 A | 5/2004 |
| JP | 2006203265 A | 8/2006 |
| RU | 2201036 C2 | 3/2003 |
| RU | 2273877 C1 | 4/2006 |
| WO | WO2006123101 A1 | 11/2006 |
| WO | WO2007062882 A2 | 6/2007 |

OTHER PUBLICATIONS

3GPP SAS: "LS on Key change in LTE active mode" Internet Citation, XP002458279 Retrieved from the Internet: URL:http://www.3gpp.org/ftp/tsg sa/WG3Security/TSGS3 47 Tallinn/Docs/S3-070475.zip> [retrieved on Nov. 12, 2007].
International Search Report and the Written Opinion—PCT/US2008/072707, International Search Authority—European Patent Office—Mar. 18, 2009.

(Continued)

*Primary Examiner* — Brandon Hoffman
(74) *Attorney, Agent, or Firm* — Michael DeHaemer

(57) ABSTRACT

Systems and methodologies are described that facilitate identifying a plurality of keysets utilized in a communications network. The keysets can include ciphering keys that provide data encryption and decryption and integrity keys that provide data integrity protection. A key identifier can be included in a packet data convergence protocol header that indicates a keyset employed in connection with data in a protocol data unit. In addition, a route indicator can be provided in a radio link control header that distinguishes a source cell and a target cell in networks configured without RLC reset.

20 Claims, 21 Drawing Sheets

OTHER PUBLICATIONS

Nokia Siemens Networks: "Key change during LTE_Active" Internet Citation, XP002458280 Retrieved from the Internet: URL:http://www.3gpp.org/ftp/tsg_sa/WG3_Securi ty/TSGS3_46b_LTESAE_adHoc_SophiaAntipolis/Docs/S3-070240.zip> [retrieved on Nov. 13, 2007].

3GPP TS 36.323 v8.2.1 3rd Generation Partnership Project; Technical Specification Group Radio Access Network; Evolved Universal Terrestrial Radio Access (E-UTRA); Packet Data Convergence Protocol (PDCP) specification ((Release 8))3GPP TS 36.323 v8.2.1 May 2000, pp. 1-25.

3GPP TS 36.322 v8.2.0 3rd Generation Partnership Project; Technical Specification Group Radio Access Network; Evolved Universal Terrestrial Radio Access (E-UTRA); Radio Link Control (RLC) protocol specification ((Release 8)) 3GPP TS 36.322 v8.2.0 May 2008, pp. 1-36.

Taiwan Search Report—TW097130463—TIPO—Dec. 20, 2011.

* cited by examiner

KEY IDENTIFIER IN PACKET DATA CONVERGENCE PROTOCOL HEADER

CLAIM OF PRIORITY UNDER 35 U.S.C. §119

The present Application for Patent claims priority to Provisional Application No. 60/954,754 entitled "METHODS AND APPARATUSES FOR USING RLC SOURCE/DESTINATION INDICATOR TOGETHER WITH PDCP CIPHERING KEY ID TO HANDLE CHANGE OF CIPHERING KEY AND/OR HANDOVER" filed Aug. 8, 2007, and assigned to the assignee hereof and hereby expressly incorporated by reference herein.

BACKGROUND

1. Field

The following description relates generally to wireless communications, and more particularly to utilizing a key identifier field in a packet header to indicate an employed keyset.

2. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

In wireless communications, data can be encoded or encrypted utilizing keysets. The keysets can include ciphering keys that facilitate encrypting data transmitted over the air. In addition, the keysets can include integrity keys that facilitate protecting integrity of data during transmission. For instance, the integrity can facilitate ensuring that data is unaltered during transmission.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with identifying a keyset among a plurality of keysets in a wireless communications system. The keysets can include ciphering keys that provide data encryption and decryption and integrity keys that provide data integrity protection. A key identifier can be included in a packet data convergence protocol header that indicates a keyset employed in connection with data in a protocol data unit. In addition, a route indicator can be provided in a radio link control header that distinguishes a source cell and a target cell in networks configured without RLC reset.

According to related aspects, a method that facilitates identifying a keyset utilized in data communications is provided. The method can comprise identifying a route indicator included in a radio link control (RLC) protocol data unit, wherein the route indicator specifies at least one of a source cell or a target cell. The method can also include detecting a key indicator in a packet data convergence protocol (PDCP) data unit, wherein the key indicator identifies at least two keysets. In addition, the method can include selecting a keyset from a plurality of keysets, wherein the selected keyset is uniquely associated with the route indicator and key indicator. The method can additionally comprise employing at least one key in the selected keyset in connection with receiving a data transmission.

Another aspect relates to an apparatus that facilitates employment of a plurality of ciphering keys to receive data in wireless communications. The apparatus can include a RLC module that determines a route identifier indicated in a RLC protocol data unit. The apparatus can also comprise a PDCP module that ascertains a keyset identifier indicated in a PDCP protocol data unit. In addition, the apparatus can include a cipher/decipher module that decodes a data transmission with a keyset selected from a plurality of keysets in accordance with the determined route identifier and keyset identifier. The apparatus can additionally comprise an integrity protection module that employs an integrity key from the selected keyset to verify integrity of the data transmission.

Yet another aspect relates to a communications apparatus that facilitates utilizing a plurality of ciphering keys. The communications apparatus can comprise means for determining a route indicator in a RLC data unit. The communications apparatus can further include means for ascertaining a keyset identifier in a PDCP data unit. In addition, the communications apparatus can comprise means for selecting a keyset from a plurality of keysets based at least in part on the route indicator and keyset identifier.

Still another aspect relates to a computer program product, which can have a computer-readable medium include code for causing at least one computer to evaluate a RLC data unit to determine a route indicator, wherein the route indicator identifies at least one of a source cell or a target cell. The computer-readable medium can also comprise code for causing at least one computer to analyze a PDCP data unit to ascertain a keyset identifier, wherein the keyset identifier specifies at least two keysets actively utilized in communications. In addition, the computer-readable medium can include code for causing at least one computer to select a keyset from a plurality of keysets in accordance with an index determined at least in part on the route indicator and the keyset identifier.

Still yet another aspect relates to a wireless communications apparatus. The wireless communications apparatus can include a memory that retains instructions related to analyzing a RLC packet to ascertain a route indicator value, evaluating a PDCP data unit to determine a key identifier value, and choosing a keyset based at least in part on the route indicator value and the keyset identifier value. In addition, the wireless communications apparatus can also include a processor, coupled to the memory, configured to execute the instructions retained in the memory.

Another aspect described herein relates to an apparatus that facilitates employment of a plurality of ciphering keys to transmit data in a wireless communications. The apparatus can include a cipher/decipher module that encodes a data transmission with a ciphering key from a keyset selected from a plurality of keysets, the selected keyset is associated with a keyset identifier and a route identifier. The apparatus can also include an integrity protection module that an integrity key from the selected keyset to sign and authenticate the data transmission. In addition, the apparatus can comprise a PDCP module that generates a PDCP protocol data unit that includes the keyset identifier associated with the selected keyset. Additionally, the apparatus can further comprise a RLC module that produces a RLC protocol data unit that includes the route identifier associated with the selected keyset.

According to yet another aspect, a method for employing a keyset in data communications is described herein. The method can comprise selecting a keyset from at least two keysets, wherein the keyset is associated with a key identifier. The method can further include indicating the key identifier associated with the selected keyset in a first protocol data unit. In addition, the method can comprise identifying a route indicator in a second protocol unit, wherein the route indicator specifies at least one of a source cell or a target cell. The method can also include employing at least one key from the selected keyset on a data transmission.

Yet another aspect relates to a communications apparatus that facilitates utilizing a plurality of ciphering keys in data transmissions. The apparatus can comprise means for choosing a keyset from at least two keysets, wherein the keyset is associated with a key identifier. The apparatus can also comprise means for embedding the key identifier associated with the chosen keyset in a PDCP data unit. In addition, the apparatus can include means for indicating a route value in a RLC data unit, wherein the route value specifies at least one of a source cell or a target cell. Moreover, the apparatus can also include means for employing the chosen keyset on a data transmission.

Still another aspect relates to a computer program product, which can have a computer-readable medium include code for causing at least one computer to select a keyset from a plurality of keysets, where in the selected keyset is associated with a route indicator and a keyset identifier. The computer-readable medium can also comprise code for causing at least one computer to encode a RLC data unit to include the route indicator associated with the selected keyset, the route indicator identifies at least one of a source cell or a target cell. In addition, the computer-readable medium can include code for causing at least one computer to indicate the keyset identifier in a PDCP data unit, the keyset identifier specifies at least two keysets actively utilized in communications.

A further aspect described herein relates to relates to a wireless communications apparatus that can comprise a memory. The memory can retain instructions related to selecting a keyset from a plurality of keysets wherein the keyset is associated with a route indicator value and a key identifiers, embedding the route indicator value in a RLC packet, encoding a PDCP data unit with the key identifier value. In addition, the wireless communications apparatus can also include a processor, coupled to the memory, configured to execute the instructions retained in the memory.

According to another aspect, a method that facilitates employing a plurality of keysets in receiving transmissions in data communications. The method can comprise determining if a key identifier presence indicator in a PDCP data unit indicates a key identifier change. The method can also include discovering a key identifier in the PDCP data unit when present. In addition, the method can include selecting a keyset from a plurality of keysets, wherein the selected keyset is uniquely associated with the key identifier. The method can additionally comprise employing at least one key from the selected keyset on a data transmission.

Another aspect relates to an apparatus that facilitates employment of a plurality of ciphering keys to receive data in wireless communications. The apparatus can include a PDCP module that determines whether a key identifier is included in a PDCP data unit, wherein the PDCP module ascertains the key identifier when present. The apparatus can also comprise a key selection module that determines a keyset from a plurality of keysets based at least in part on the ascertained key identifier. In addition, the apparatus can include a cipher/decipher module that decodes a data transmission with a ciphering key included in the determined keyset. The apparatus can additionally comprise an integrity protection module that verifies integrity of the data transmission with an integrity key in the keyset.

Yet another aspect relates to a communications apparatus that facilitates utilizing a plurality of ciphering keys in data transmissions. The communications apparatus can comprise means for evaluating a PDCP packet to determine whether a key identifier is included in the packet. The communications apparatus can further include means for ascertaining the key identifier when included from the PDCP packet. In addition, the communications apparatus can comprise means for selecting a keyset in accordance with the ascertained key identifier. Moreover, the communications apparatus can include means for utilizing at least one key from the selected keyset on a data transmission.

Still another aspect relates to a computer program product, which can have a computer-readable medium include code for causing at least one computer to determine if a key identifier is included in a PDCP data unit. The computer-readable medium can also comprise code for causing at least one computer to extract the key identifier from the PDCP data unit when present. In addition, the computer-readable medium can include code for causing at least one computer to select a keyset from a plurality of keysets, the selected keyset is associated with the extracted key identifier.

Still yet another aspect relates to a wireless communications apparatus. The wireless communications apparatus can include a memory that retains instructions related to deciding if a key identifier is included in a PDCP data unit, determining key identifier when included in the data unit, and selecting a keyset from a plurality of keysets wherein the keyset is associated with the key identifier. In addition, the wireless communications apparatus can also include a processor, coupled to the memory, configured to execute the instructions retained in the memory.

According to yet another aspect, a method that facilitates re-keying in data communications is described herein. The method can comprise selecting a keyset from at least two keysets, the keyset is associated with a key identifier. The method can further include indicating a presence of the keyset identifier in a PDCP data unit. In addition, the method can comprise embedding the keyset identifier in the PDCP protocol unit. The method can also include applying at least one key in the selected keyset to a data transmission.

Another aspect described herein relates to an apparatus that facilitates employing a plurality of keysets in data communications. The apparatus can include a cipher/decipher module that encodes a data transmission with a ciphering key included in a keyset selected from a plurality of keysets, the selected keyset is associated with a key identifier. The apparatus can also include an integrity protection module that an integrity key from the selected keyset to sign and authenticate the data transmission. In addition, the apparatus can comprise a PDCP module that generates a PDCP protocol data unit that includes the keyset identifier and a key identifier presence indicator.

Yet another aspect relates to a communications apparatus that facilitates utilizing a plurality of ciphering keys in data transmissions. The apparatus can comprise means for choosing a keyset from at least two keysets, the keyset is associated with a key identifier. The apparatus can also comprise means for signaling a presence of the keyset identifier in a PDCP data unit. In addition, the apparatus can include means for incorporating the keyset identifier in the PDCP protocol unit. Moreover, the apparatus can also include means for utilizing at least one key from the chosen keyset on a data to be transmitted.

Still another aspect relates to a computer program product, which can have a computer-readable medium include code for causing at least one computer to select a keyset from a plurality of keysets, the selected keyset is associated with a keyset identifier. The computer-readable medium can also comprise code for causing at least one computer to indicate presence of the keyset identifier in a PDCP data unit. In addition, the computer-readable medium can include code for causing at least one computer embed the keyset identifier in the PDCP data unit, wherein the keyset identifier specifies at least two keysets actively utilized in communications.

A further aspect described herein relates to relates to a wireless communications apparatus that can comprise a memory. The memory can retain instructions related to selecting a keyset from at least two keysets, the keyset is associated with a key identifier, indicating a presence of the keyset identifier in a PDCP data unit, embedding the keyset identifier in the PDCP protocol unit, and encrypting a data transmission with at least one key in the selected keyset In addition, the wireless communications apparatus can also include a processor, coupled to the memory, configured to execute the instructions retained in the memory.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
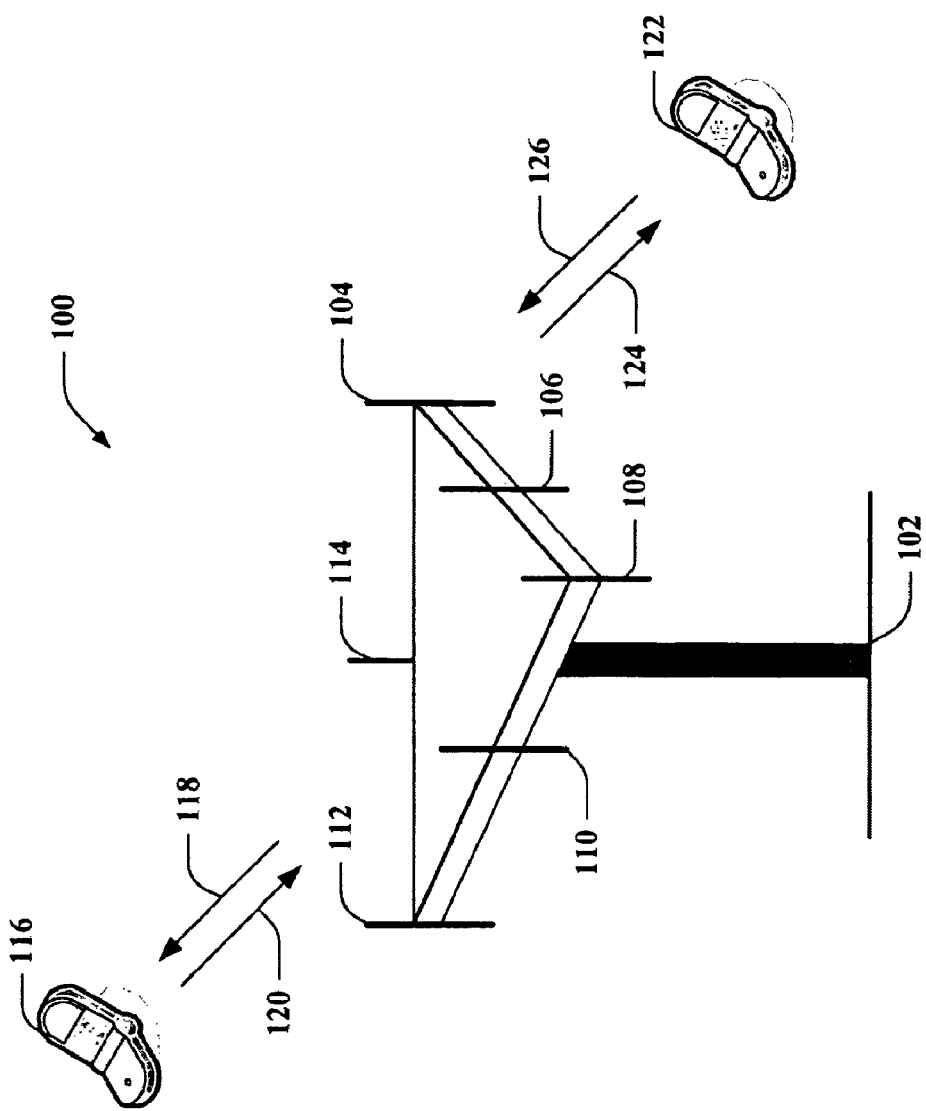
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example. According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like.

Pursuant to an illustration, base station 102 and mobile devices 116 and 122 can employ a keyset in connection with transmitting and receiving communications. For instance, base station 102 can employ a keyset to cipher data transmissions sent to mobile devices 116 and 122 over forward links 118 and 124, respectively. In addition, the base station 102 can employ the keyset to provide integrity protection to transmissions. Moreover, mobile devices 116 and 122 can employ a keyset to protect and cipher uplink transmission over reverse links 120 and 126, respectively. Integrity protection enables receivers (e.g., base station 102 or mobile devices 116 and 122) to verify integrity of a data transmission and identify of the transmission source to prevent masquerading. The base station 102 can indicate to mobile devices 116 and 122 an index or other identifier that enables the mobile devices 116 and 122 to derive the keyset. Further, in accordance with a security policy, the base station can initiate a re-keying procedure that alters the keyset employed in communications with mobile devices 116 and 122.

In one example, mobile device 116 and 122 handoffs from base station 102 to base station 102 (e.g., hands-off to the same cell) in order to complete a re-keying procedure. After the hand-off, mobile devices 116 and 122 can be instructed as to how to derive a new keyset. In accordance with an aspect of the subject disclosure, a plurality of keysets can be outstanding (e.g., available for use). For instance, base station 102 can indicate to mobile devices 116 and 122 to generate at least two keysets. The base station 102 and/or the mobile devices 116 and 122 can utilize an identifier in a header to specify the keyset utilized in a transmission. Moreover, additional keysets can be derived (e.g., during handovers) and uniquely referenced without conflicting with other outstanding keysets. For example, a source base station can forward data to a target base station so that the target base station can transmit to a mobile device that has handed off. The source base station can unique identify the keyset utilized in the forwarded data to obviate the need to retain and forward unciphered data.

Figure 2:
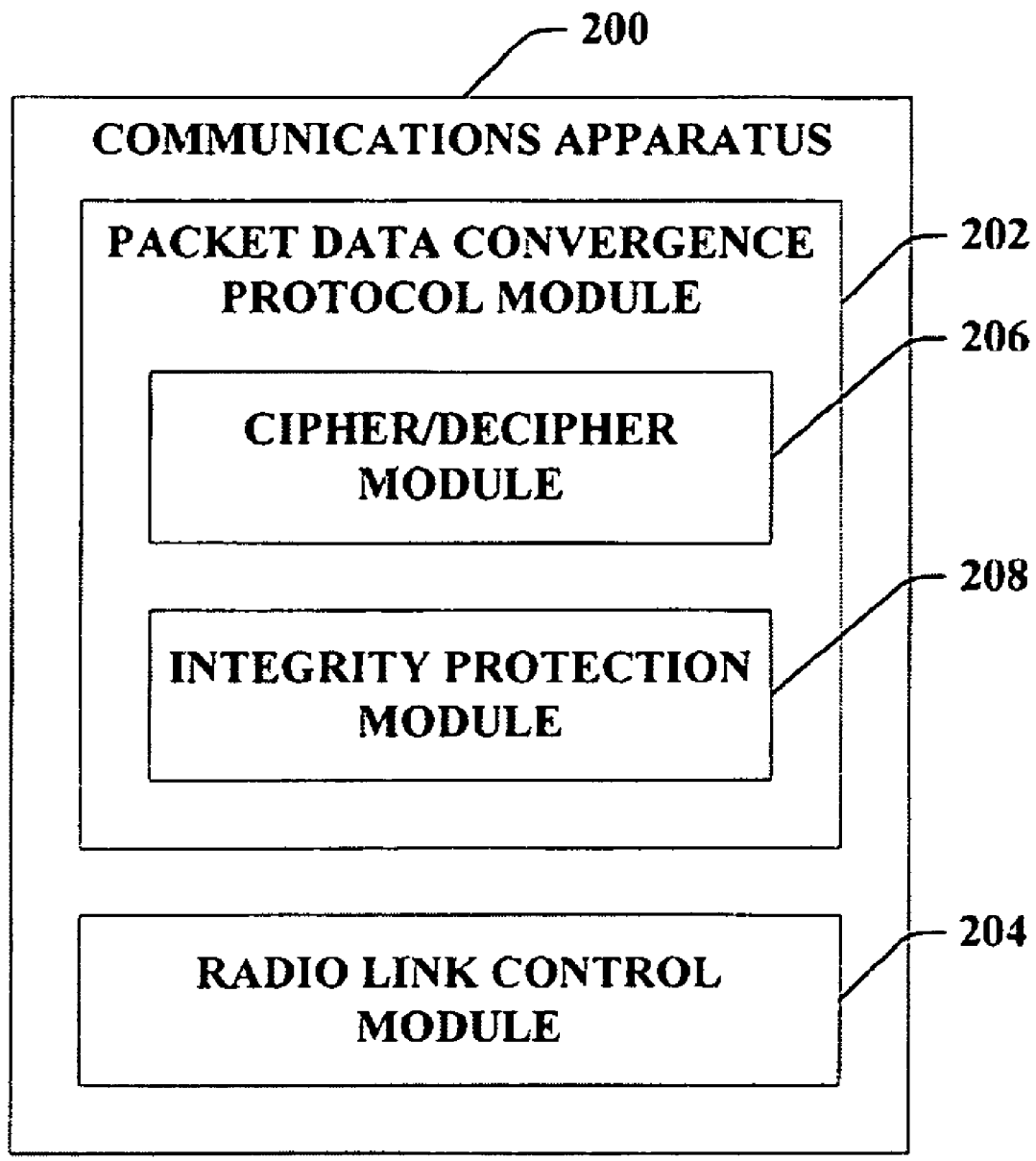
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a packet data convergence (PDCP) module 202 that can manage the PDCP layer in wireless communications. For example, the PDCP module 202 can perform IP header compression and decompression, user data transfer, maintenance of sequence numbers for radio bearers and the like. The communications apparatus 200 can further include a radio link control (RLC) module 204 that provides RLC protocol functionality. The PDCP module 202 and the RLC module 204 can generate and/or pack information into headers, packets, payloads, protocol data units (PDUs), etc. associated with the respective protocols.

Pursuant to an example, the communications apparatus 200 can utilize a plurality of keysets in transmitting and receiving data. A keyset can include keys that cipher/decipher data and keys that provide integrity protection. Conventionally, a single keyset is outstanding or employed by a communications apparatus. In accordance with an aspect, the communications apparatus 200 can utilize at least two outstanding keysets. The PDCP module 202 and/or the RLC module 204 can include information in headers or packets that identify one of a plurality of keysets. The identified keyset can be employed by the communications apparatus 200 to transmit data. In addition, the communications apparatus 200 can analyze packets and/or headers of incoming data to determine the keyset utilized in connection with the incoming transmission.

In one illustration, the PDCP module 202 and the RLC module 204 include information in respective protocol data units (PDUs) to identify an employed keyset from among a plurality of keysets. In particular, the PDCP module 202 and RLC module 204 can coordinate to select one of at least four keysets. For example, the PDCP module 202 can include information in a PDU that specifies a first or second keyset of a base station and the RLC module 204 can generate a PDU that identifies the base station that originated the transmission. For example, in a handover situation, a mobile device can hand-off to a target base station while data is still queued at a source base station (e.g., the original base station prior to handover). The source base station forwards the data to the target base station for transmission to the mobile device. The queued data can be ciphered with a keyset of the source base station, which is different from keysets utilized by the target base station. Accordingly, the RLC module 204 can facilitate identification of the base station so that an appropriate keyset can be employed to receive forwarded data.

Pursuant to this illustration, RLC PDUs and PDCP PDUs are both utilized to fully identify an employed keyset. Accordingly, this aspect is suitable to wireless communications networks with multiple RLCs that do not reset on handover. For example, RLC PDUs are forwarded in handover situations along with PDCP PDUs. In this manner, the RLC PDU can facilitate distinguishing a keyset identify in a PDCP PDU of a source base station from a keyset identified in a PDCP PDU of a target base station. According to an illustrative embodiment, the PDCP PDU, in a multiple RLC environment, can include a key identifier that specifies at least one of a first or second keyset. In addition, the RLC PDU can include a route indicator that specifies at least one of a source cell (e.g., base station) or a target cell. The route indicator informs a receiver which base station corresponds to the associated key identifier in the PDCP PDU. The key identifier in the PDCP PDU combined with the route indicator in the RLC PDU provides unique identification of a keyset within a wireless communications network from a perspective of a receiver.

In accordance with another aspect, the PDCP module 202, operating alone, can include information in respective protocol data units (PDUs) to identify an employed keyset from among a plurality of keysets. In this illustrative embodiment, the RLC module 204 does not keyset identification. Accordingly, this aspect is suitable for wireless network environments in which there are not multiple RLCs. The PDCP module 202 can generate a PDU that includes a key identifier in cases where the keyset changes. For example, a key identifier can be included in a PDU upon initiation of a re-keying procedure. The PDCP module 202 includes the key identifier in a PDU that utilizes a different keyset than a previously transmitted keyset. The inclusion of a key identifier notifies a receiver that a new keyset is to be employed. Absent a key identifier, a receiver can assume a currently utilized keyset is still active.

The PDCP PDU generated by the PDCP module 202 can include a key identifier presence indicator that informs a receiver of a keyset change. For instance, the key identifier presence indicator can specify that a key identifier is included in the PDU (e.g., a keyset change has occurred and the included key identifier is the new keyset). In addition, the key identifier presence indicator can designate that a key identifier is not included and, accordingly, a previously identified keyset is utilized. The key identifier can identify at least four keysets. The four keysets include at least two keysets employed by a base station and mobile device and at least one keyset associated with a target base station in a handover.

The communications apparatus 200 can receive and/or transmit data ciphered with at least one key in a keyset. For example, the communications apparatus 200 can receive a transmission from a base station or mobile device via a downlink or uplink, respectively. Conversely, the communications apparatus can transmit data to a base station or mobile device. In receiving data, the RLC module 204 can analyze a RLC PDU to determine a route indicator specified therein. The route indicator can identify at least one of a source base station (e.g., a source cell or sector) or a target base station (e.g., a target cell or sector). The route indicator defines a subset of the plurality of keysets that includes the keyset employed to cipher and/or integrity protect the transmission. After identification of the route, the PDCP module 202 can evaluate a PDCP PDU to ascertain a key identifier included therein. The key identifier indicates a keyset within the subset defined by the route indicator. In accordance with another example, the PDCP module 202 can determine if a key identifier is included in the PDU. For instance, the PDCP module 202 can analyze a key identifier presence indicator to determine if the key identifier is contained in the PDU. The PDCP module 202 can extract the key identifier, if present, to identify a keyset utilized to cipher and/or integrity protect a transmission without relying on a route indicator to define a subset.

In transmitting data, the PDCP module 202 can embed a key identifier in a PDCP PDU. The key identifier can include at least one of two keysets employed to cipher or integrity protect data to be transmitted. The key identifier specifies a keyset within a subset of a plurality of keysets wherein the subset corresponds to a particular base station. The RLC module 204 can include a route indicator in a RLC PDU that identifies at least one of a source cell or a target cell. In another aspect, the PDCP module 202 can encodes a key identifier presence indicator. The presence indicator notifies a recipient of a change in keyset. For instance, the PDCP module 202 can set the indicator to specify if a key identifier is included in the PDU. The PDCP module 202 can include a key identifier in the PDU that indicates a new keyset different from an immediately previously utilized keyset.

The PDCP module 202 can include a cipher/decipher module 206 that can employ a cipher key within a keyset to encrypt and/or decrypt data in a transmission. The PDCP module 202 can further include an integrity protection module 208 that utilizes an integrity key within a keyset to provide integrity protection. For example, the integrity key can provide authentication among parties in a wireless communications network. In addition, the PDCP module 202 can determine if a data transmission is control data or user data and indicate the data type in the PDU. In one example, the PDCP module 202 employs a keyset to user data transmission but not control data.

Moreover, although not shown, it is to be appreciated that communications apparatus 200 can include memory that retains instructions with respect to identifying and setting key identifiers in PDCP data units, identifying and setting route indicators in RLC data units, selecting keys based at least in part on key identification information, employing keysets on data and the like. In addition, the memory can retain derived keysets that are outstanding or instructions to generate a keyset upon request. Further, communications apparatus 200 may include a processor that may be utilized in connection with executing instructions (e.g., instructions retained within memory, instructions obtained from a disparate source, ... ).

Figure 3:
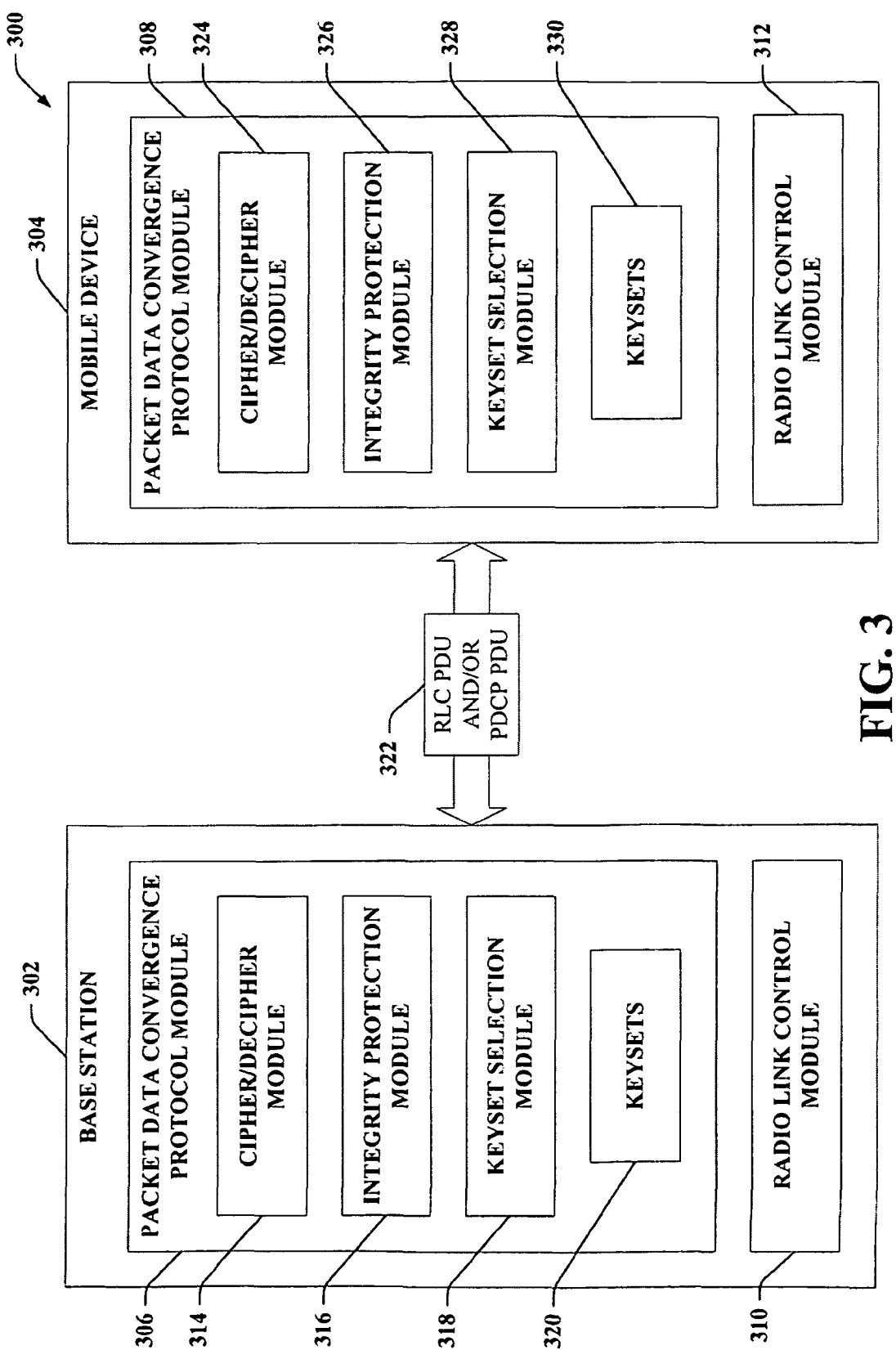
FIG. 3 is an illustration of an example wireless communications system that facilitates employing a plurality of keysets for integrity protection and/or data encryption.

Now referring to FIG. 3, illustrated is a wireless communications system 300 that facilitates employing a plurality of keysets for integrity protection and/or data encryption. The system 300 includes a base station 302 that can communicate with a mobile device 304 (and/or any number of disparate devices (not shown)). The base station 302 can transmit information to the mobile device 304 over a forward link channel or downlink channel; further base station 302 can receive information from the mobile device 304 over a reverse link channel or uplink channel. Moreover, system 300 can be a MIMO system. Additionally, the system 300 can operate in an OFDMA wireless network (such as 3GPP, 3GPP2, 3GPP LTE, etc., for example). Also, the components and functionalities shown and described below in the base station 302 can be present in the mobile device 304 and vice versa, in one example.

The base station 302 can include a packet data convergence protocol (PDCP) module 306 that can manage the PDCP layer in wireless communications. In particular, the PDCP module 306 can generate and/or analyze protocol data units (PDUs) associated with the PDCP layer to ascertain keyset information. For instance, the PDCP module 306 can encode information into a PDU associated with a data transmission to mobile device 304 wherein the encoded information specifies a keyset utilized to cipher the data and/or provide integrity protection. In addition, the PDCP module 306 can analyze a received PDCP PDU from the mobile device 304 to determine a keyset employed by the mobile device 304. Similarly, the mobile device 304 includes a PDCP module 308 that performs substantially similar operations as the PDCP module 306 of the base station 302.

In accordance with an aspect, the base station 302 can include a radio link control (RLC) module 310 that can facilitate identifying a keyset. For example, the wireless communications system 300 can be configured to forward RLC PDUs in handover situations in addition to PDCP PDUs. Accordingly, the RLC module 310 can generate a PDU that includes a route indicator that specifies whether the keyset information in the PDCP PDU corresponds to a source base station or a target base station of a handover. Moreover, the mobile device 304 can include an RLC module 312 that can generate similar RLC PDUs as RLC module 310 of base station 302. In addition, the RLC module 312 of mobile device 304 can analyze received RLC PDUs to determine which base station is associated with a transmission so that an appropriate keyset can be selected for decryption and/or to verity integrity. According to another aspect, the PDCP modules 306 and 308 can include a full key identifier (e.g., does not require a route indicator to fully specify a keyset in a plurality of keysets). The full key identifier is appropriate when the wireless communication system 300 does not forward RLC PDUs in handover situations. For example, the PDCP modules 306 and 308 can include the key identifier only when a keyset change occurs. The PDCP modules 306 and 308 can include a presence indicator in the PDU that notifies receivers that a different keyset is utilized and that a corresponding key identifier has been appended to the PDU.

Pursuant to an example, the base station 302 and mobile device 304 can communicate with a first keyset that provides encryption and/or integrity protection. The keyset facilitates ensuring that transmitted user data remains private and that parties to the communications are authenticated. The PDCP module 306 includes a cipher/decipher module 314 that employs a ciphering key in a keyset to encrypt user data (e.g., control data is not encrypting, in one example), a integrity protection module 316 that utilizes an integrity key in a keyset to at least authenticate parties to a connection, a keyset selection module 318 that determines a keyset based upon key identifier information in PDCP PDUs and/or RLC PDUs. Moreover, the keyset selection module 318 can determine key identifier information based upon a keyset selected to facilitate transmission of data. The PDCP module 302 can further include keysets 320 that includes at least two keysets and/or indices to derive or retrieve the at least two keysets.

In transmitting data to mobile device 304, the base station 302 selects a keyset from a plurality of keysets 320. The selected keyset can include at least a ciphering key that encrypts and decrypts user data. In addition, the selected keyset can also include an integrity key that facilitates integrity protection. The cipher/decipher module 314 can employ the ciphering key to encrypt data. The integrity protection module 316 can utilize the integrity key to enable integrity protection. The PDCP module 306 can include key identifying information into a PDCP PDU that is transmitted to the mobile device 304. In one embodiment, the key identifying information can include a key identifier that specifies one of at least two keysets. In connection with this key identifier, the RLC module 310 can generate a route indicator in an RLC PDU that, in combination with the PDCP key identifier, uniquely specify a keyset among a plurality of keysets. In another aspect, the key identifying information can comprise a key identifier presence indicator that notifies a receiver that a keyset change has occurred and that a key identifier of a new keyset is included in the PDCP module. After embedding key identifying information, the base station 302 can transmit a PDCP PDU and/or a RLC PDU 322 to the mobile device 304.

The mobile device 304 receives the PDCP PDU and/or the RLC PDU 322. In one example, the RLC module 312 can analyze the RLC PDU to determine a route indicator value contained therein. The route indicator value defines a subset in a plurality of keysets from which the utilized keyset is drawn. The PDCP module 308 can evaluate the PDCP PDU to ascertain a key identifier value that indicates one of at least two keysets in the subset defined by the route indicator value. Pursuant to another illustration, the PDCP module 308 can analyze the PDCP PDU to determine a key identifier presence indicator value that indicates if a key identifier is included in the PDCP PDU. If the key identifier is present, the PDCP module 308 can extract the identifier. Otherwise, the PDCP module 308 can assume that a previously utilized keyset is still active.

When a key identifier is determined (e.g., a full identifier or a partial identifier combined with a route indicator), a keyset selection module 328 can utilize the identifier to select the appropriate keyset from keysets 330. For instance, the identifier can be an index to retained keysets or an index to a routine that derives keysets. The PDCP module 308 includes a cipher/decipher module 324 that decrypts user data with a ciphering key include in the selected keyset. The PDCP module 308 can also include an integrity protection module 326 that can verity integrity and/or authenticity of the base station 302.

Moreover, it to be appreciated that similar procedures and operations described above can also apply to uplink transmission from mobile device 304 to base station 302. In uplink transmission, the mobile device 304 prepares a PDCP PDU and/or an RLC PDU to transmit to the base station 302. The base station 302 extracts the keyset identification information in order to select the appropriate keyset for deciphering and/or integrity protection.

Figure 4:
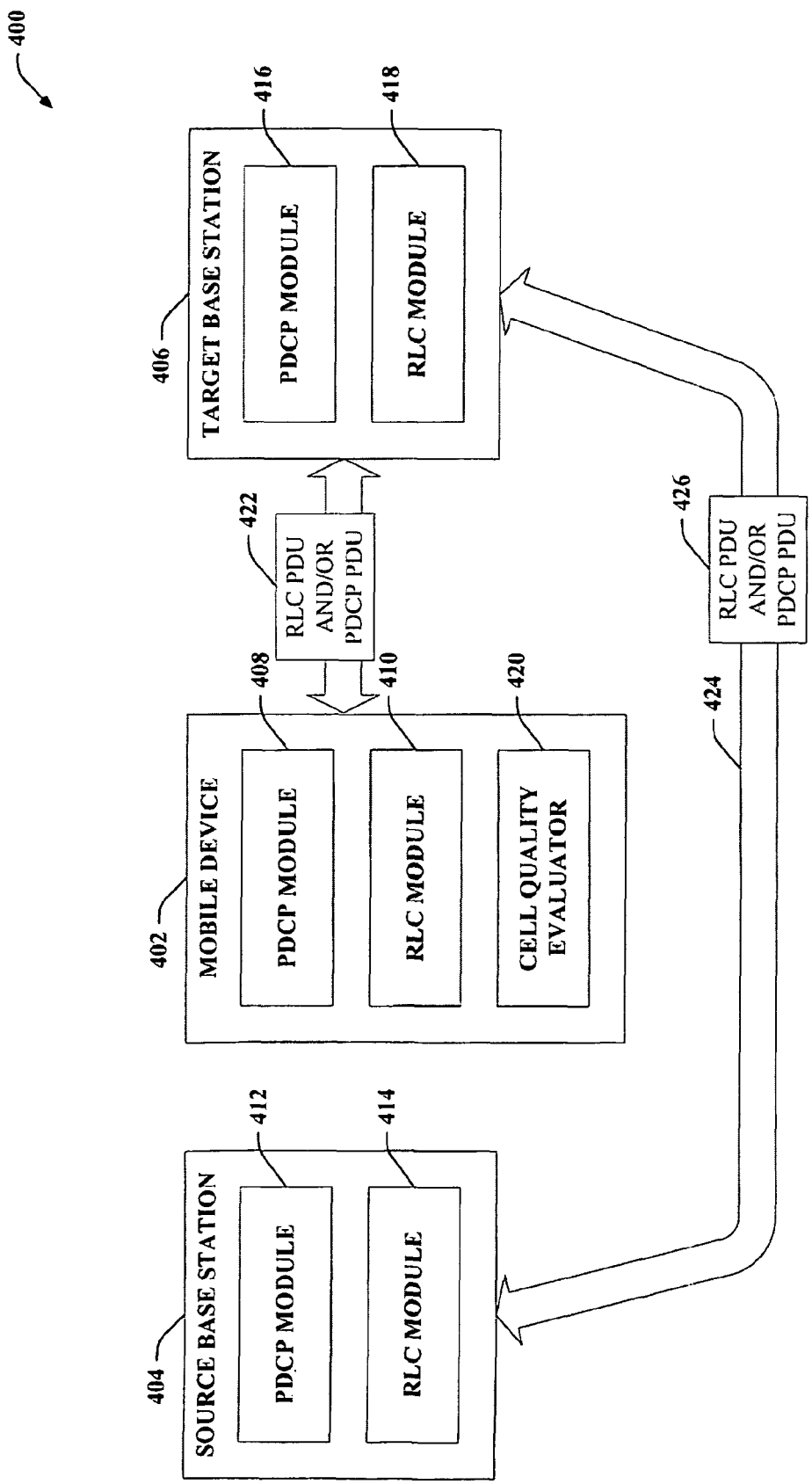
FIG. 4 is an illustration of an example wireless communications system that facilitates identifying keysets in handover situations.

Turning now to FIG. 4, illustrated is a wireless communications system 400 that facilitates identifying keysets in handover situations. The system 400 includes a mobile device 402 that handed off from a source base station 404 to a target base station 406. The mobile device can include a PDCP module 408 and a RLC module 410. Moreover, the source base station 404 and target base station 406 can include corresponding PDCP modules 412 and 416, respectively, and RLC modules 414 and 418, respectively. The respective PDCP modules and RLC modules can be similar to PDCP modules and RLC modules described above with reference to FIGS. 2 and 3.

Prior to handover, the mobile device 402 and source base station 404 utilized one of at least two keysets. If a re-keying procedure commenced before handover, two keysets can be employed simultaneously. For example, the source base station 404 can initiate a re-keying procedure and being utilizing a new keyset. In the interim, the mobile device 402 continues to employ an old keyset until re-keying completes. In addition, once a handover occurs, the mobile device 402 utilizes keyset associated with the target base station 406 for transmitting and receiving RLC PDUs and PDCP PDUs 422. However, user data for mobile device 402 can be queued at the source base station 404 after the handover and, further, the user data can be ciphered or integrity protected with a keyset associated with the source base station. Accordingly, the system 400 is capable of identifying at least three distinct keysets at any given time.

In one example, the source base station 404 forwards RLC PDUs and PDCP PDUs 426 to the target base station 406 so that the target base station 406 can transmit the PDUs to the mobile device 402 after handover. Pursuant to an illustration, the PDUs 426 can be forwarded on a backplane 424 such as, for example, an X2 interface. The RLC PDU can include a route indicator that specifies that the PDUs originated from the source base station 404 and the PDCP PDU can include a key identifier. The route indicator informs the mobile device 402 that a keyset associated with the source base station 404 and corresponding to the key identifier in the PDCP is to be employed to receive the data.

In another example, the source base station 404 forwards only PDCP PDUs to the target base station 406. The PDCP module 412 of the source base station 404 can include a key identifier associated with a keyset employed by the PDCP module 412. In addition, the PDCP module 412 can include a presence indicator in the PDU to notify the mobile device 402 that a different keyset is utilized with the PDU.

The mobile device 420 can include a cell quality evaluator 420 that generates measurement reports related to cell quality. These measurements report can indicate a change in a best serving cell (e.g., from source cell to target cell). The handover can be initiated by the source base station 404 after receiving a report that the target base station 406 is a better serving cell.

Figure 5:
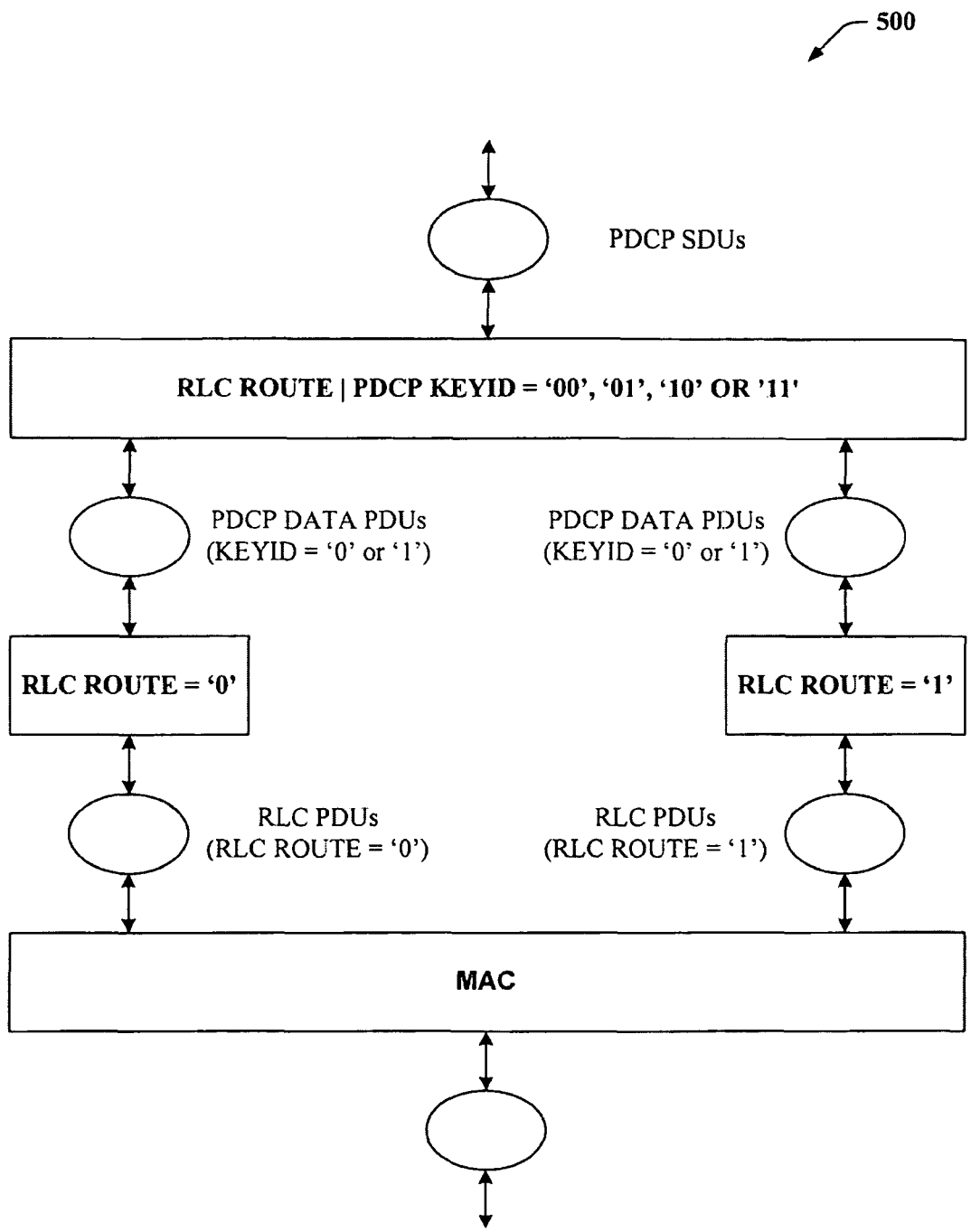
FIG. 5 is an illustration of an example layer model in accordance with an aspect of the subject disclosure.

Turning now to FIG. 5, an example layer model 500 is depicted in accordance with an aspect of the subject disclosure. The layer model 500 illustrates a media access control (MAC) layer, a radio link control (RLC) layer without RLC reset (e.g., two RLC routes), and a packet data convergence protocol (PDCP) layer. While only three layers are depicted, it is to be appreciated that other layers (not shown) can be involved in wireless communications between devices. In transmitting data, higher layers request services from the PDCP layer. At the PDCP layer, a keyset is employed to cipher user data and/or enable integrity protection. The selected keyset is associated with a RLC route indicator concatenated with a key identifier. The PDCP includes a key identifier (e.g., a zero bit or a one bit) in a protocol data unit (PDU) and requests the services of the RLC layer to transmit the data. The RLC layer can have one of two routes associated with a source or target cell in a handover. The RLC layer includes a route indicator (e.g., a zero bit or a one bit) in a RLC PDU that is provided to the MAC layer and a physical layer (not shown) for transmission.

Figure 6:
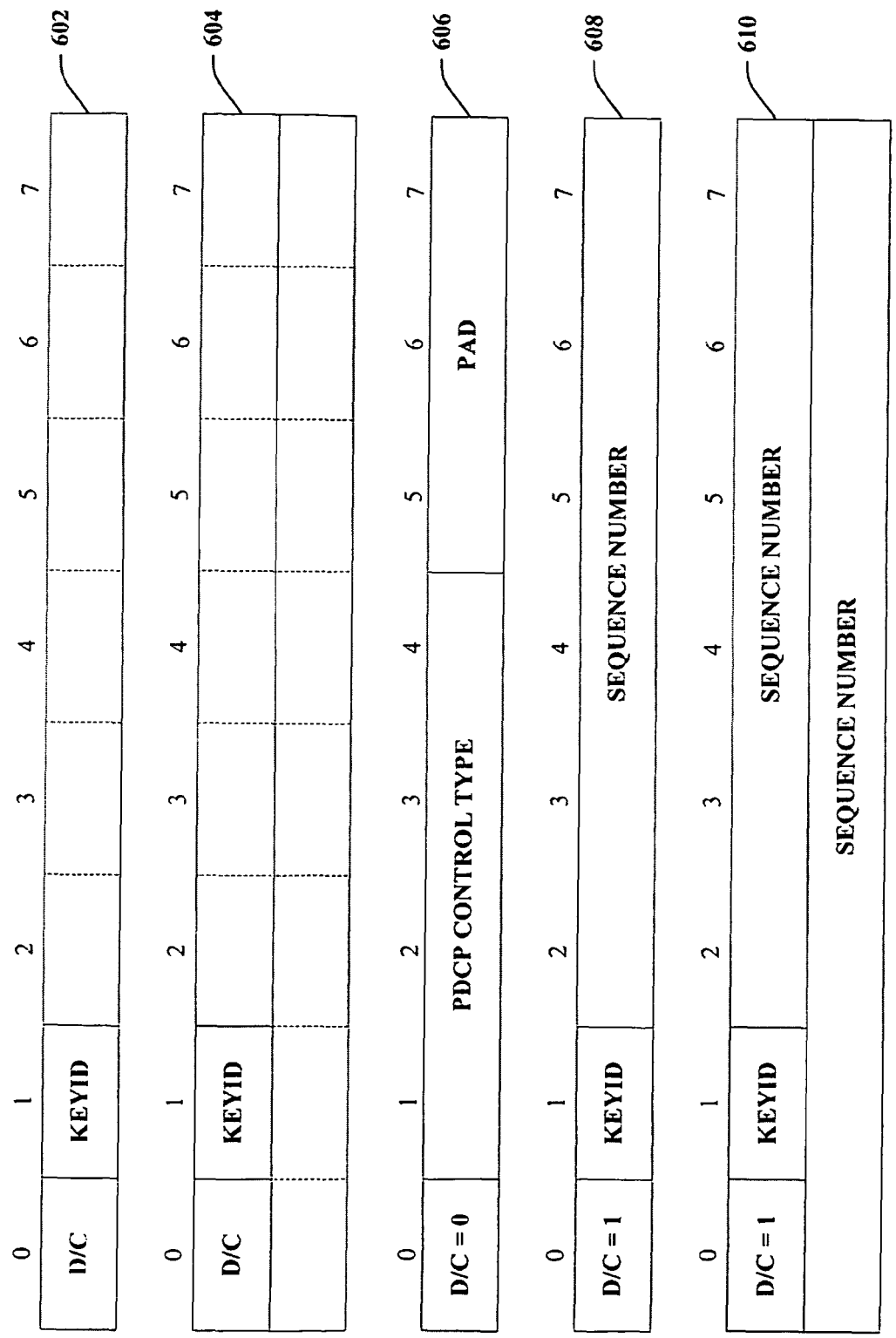
FIG. 6 is an illustration of example header formats that include a keyset identifier.

FIG. 6 illustrates example PDCP header formats in accordance with the layer model described with reference to FIG. 5. Format 602 is an eight-bit PDCP header format. At bit zero of format 602, a data/control indicator is included to specify if the PDCP PDU is control data or user data. Bit one includes a key ID that provides indicates if a first or second keyset is employed. The remaining bits of format 602 include a sequence number. Format 604 is a sixteen-bit PDCP header format that includes similar fields to format 602 with the exception that the sequence number field includes an additional eight bits. Header formats 606-610 depict example headers with field values inserted. For example, format 606 includes a value of zero for the data/control indicator at bit location zero. This can indicate that the PDU is a control PDU and that ciphering or integrity protection is not required (e.g., a keyset is not employed). At bits 1 through 4 of format 606, a PDCP control type is specified. For instance, the control type can be a PDCP status PDU, a ROHC control PDU or any other type. Moreover, format 606 can contain a three-bit pad that fills the remaining space in the header.

Formats 608 and 610 indicate data PDUs (e.g., the data/control indicator value is one). Format 608 is an eight-bit header that includes a key ID that can be a zero or one to indicate a first or second keyset and a 6 bit sequence number. Format 610 is a sixteen-bit header that includes the key ID and a 14-bit sequence number.

Figure 7:
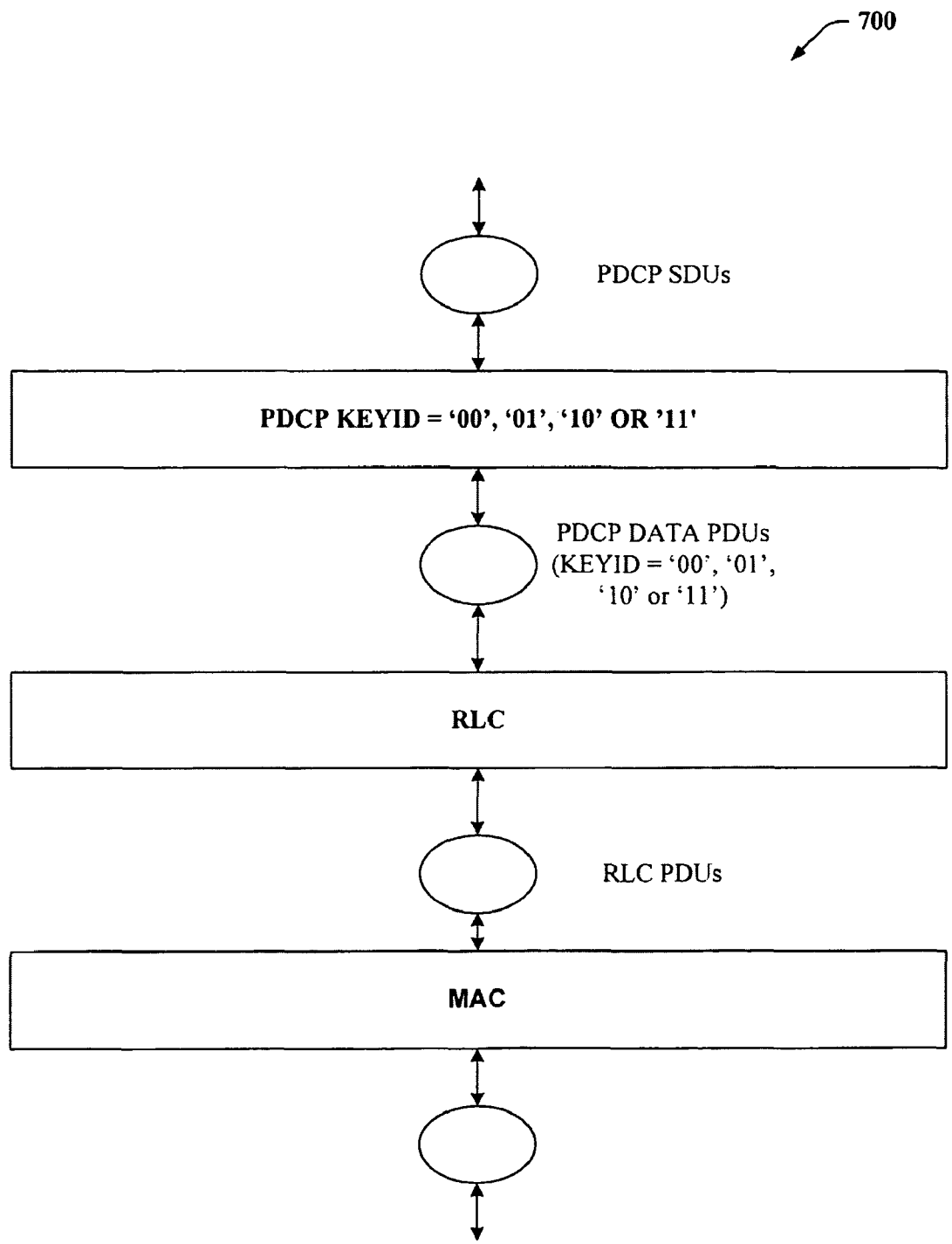
FIG. 7 is an illustration of an example layer model in accordance with an aspect of the subject disclosure.

Turning now to FIG. 7, an example layer model 700 is depicted in accordance with an aspect of the subject disclosure. The layer model 700 illustrates a media access control (MAC) layer, a radio link control (RLC) layer with RLC reset (e.g., one RLC), and a packet data convergence protocol (PDCP) layer. While only three layers are depicted, it is to be appreciated that other layers (not shown) can be involved in wireless communications between devices. In transmitting data, higher layers request services from the PDCP layer. At the PDCP layer, a keyset is employed to cipher user data and/or enable integrity protection. The selected keyset is associated with a key identifier. The PDCP includes a two-bit key identifier in a protocol data unit (PDU) and requests the services of the RLC layer to transmit the data. The RLC layer, the MAC layer and a physical layer (not shown) can further process the PDCP PDU prior to transmission.

Figure 8:
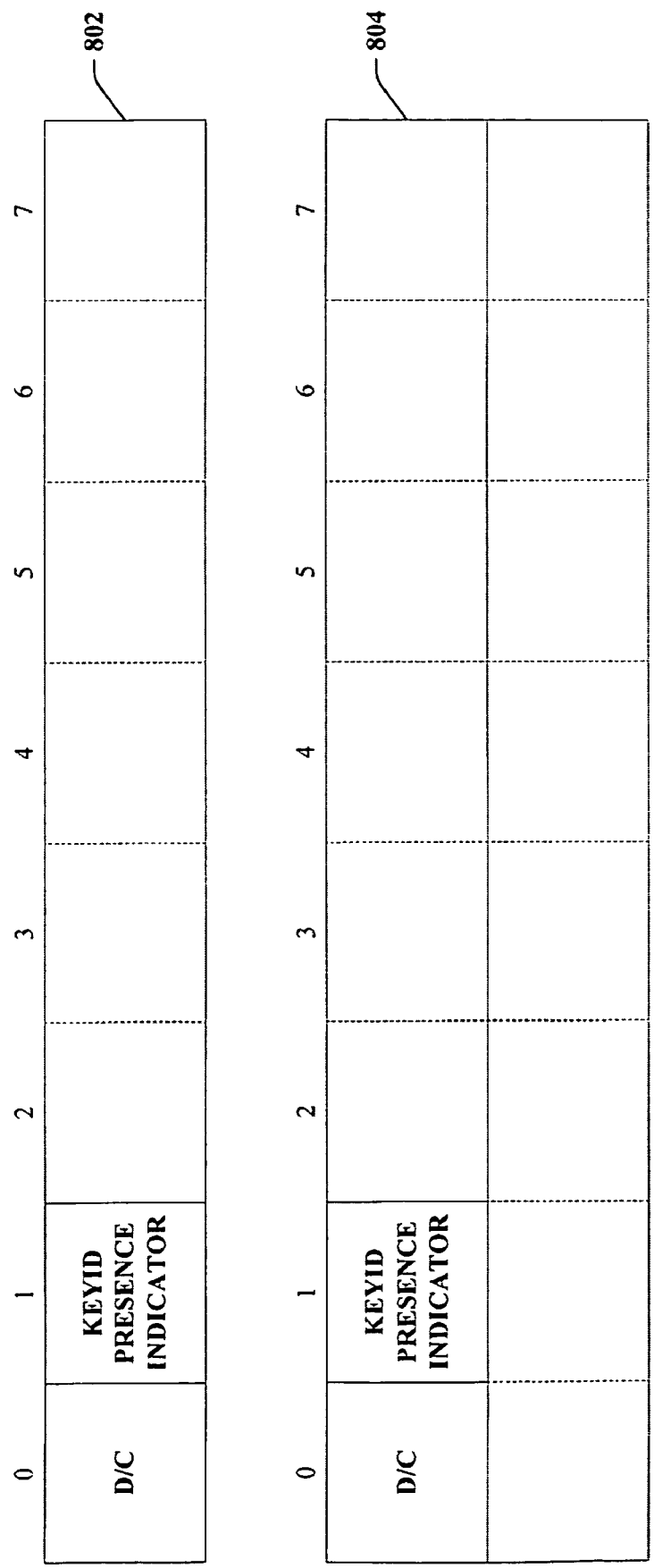
FIG. 8 is an illustration of example header formats that include a keyset presence indicator.

FIG. 8 illustrates example header layouts in accordance with the layer module described with reference to FIG. 7. Format 802 is an eight-bit format that includes a data/control indicator as described above with reference to FIG. 6. In addition, the format 802 can include a key presence indicator value at bit one. The key presence indicator value specifies whether a key ID is appended to the header. In one example, a key ID can be appended when a keyset different from a previously utilized keyset is employed with to cipher or integrity protect a PDU. Format 802 also includes a 6-bit sequence number. Format 804 is a sixteen-bit header format that includes the fields from format 802. In format 802, the sequence number is 14 bits in length.

Figure 9:
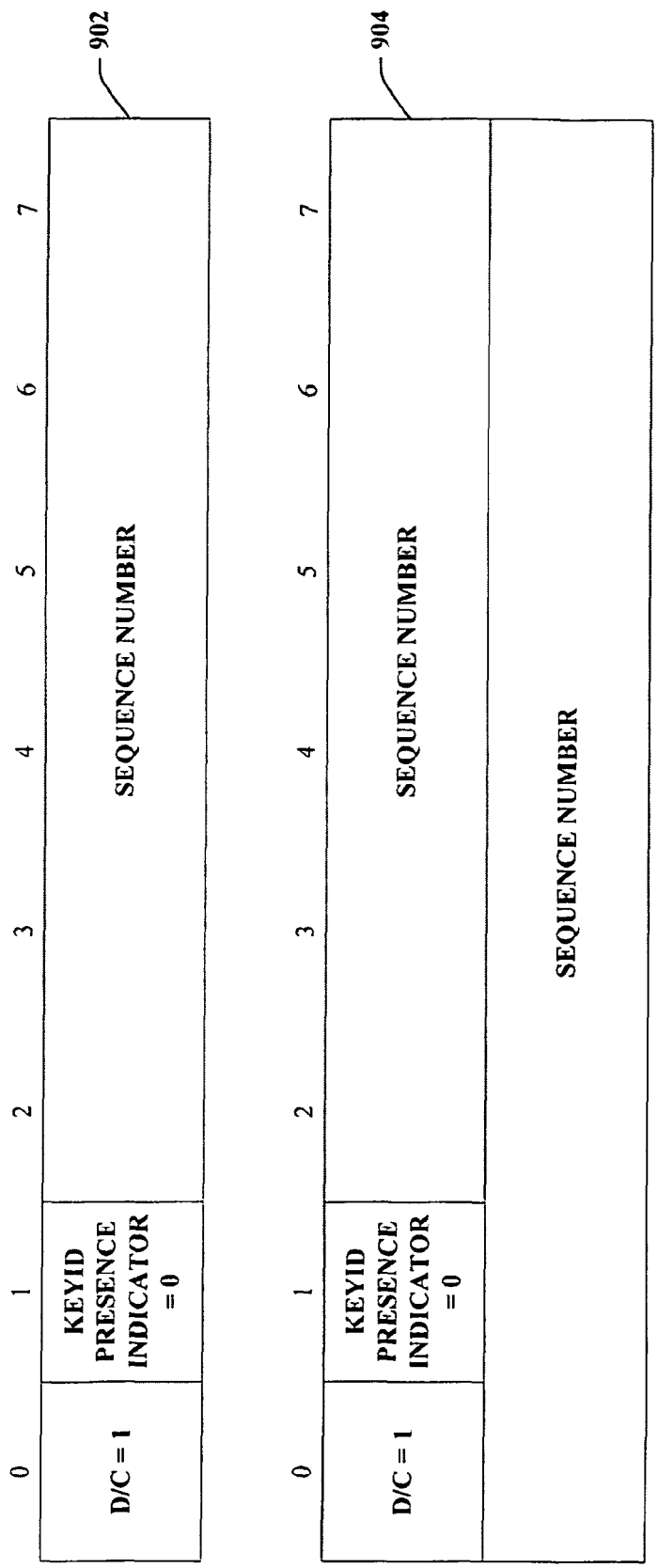
FIG. 9 is an illustration of example headers that include a keyset presence indicator.
Figure 10:
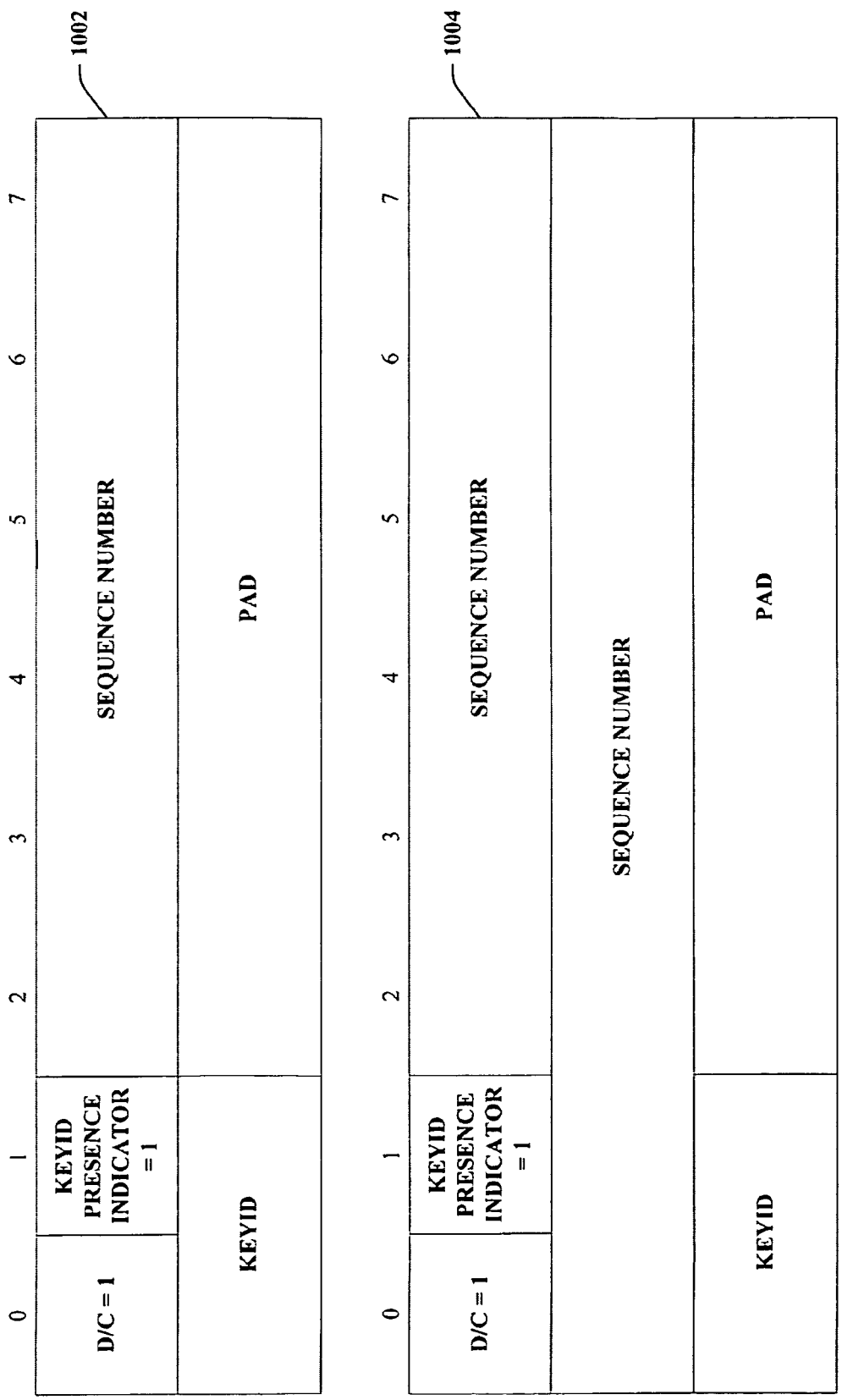
FIG. 10 is an illustration of example headers that include a keyset presence indicator according to an aspect of the subject disclosure.

FIGS. 9 and 10 illustrate header formats with example values inserted. The example headers in FIGS. 9 and 10 include a data/control indicator value of one (e.g., the examples are data PDUs) as a control PDU would be identical to format 606 from FIG. 6. Format 902 in FIG. 9 is an eight-bit format with a data/control indicator value at bit location zero. At bit location one, format 902 includes a key ID presence indicator. In this example, the presence indicator is set to a value of zero to indicate that a key ID is not included in the header. The remaining 6 bits of the header include a sequence number. Format 904 is a sixteen-bit format that includes the fields from format 902. In addition, format 904 contains a 14-bit sequence number as opposed to a 6-bit sequence number. Formats 1002 and 1004 from FIG. 10 include header formats wherein the key ID presence indicator includes a value of one to indicate that a key ID is included in the header. Format 1002 includes the eight-bit format of 902 with an additional 8 bits appended thereto. The additional 8 bits include a two-bit key identifier and a 6-bit pad. Format 1004 includes the sixteen-bit format of 094 with an additional 8 bits appended thereto. The additional 8 bits include a two-bit key identifier and a 6-bit pad.

Referring to FIGS. 11-14, methodologies relating to identifying a keyset from a plurality of keysets in a communications network are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 11:
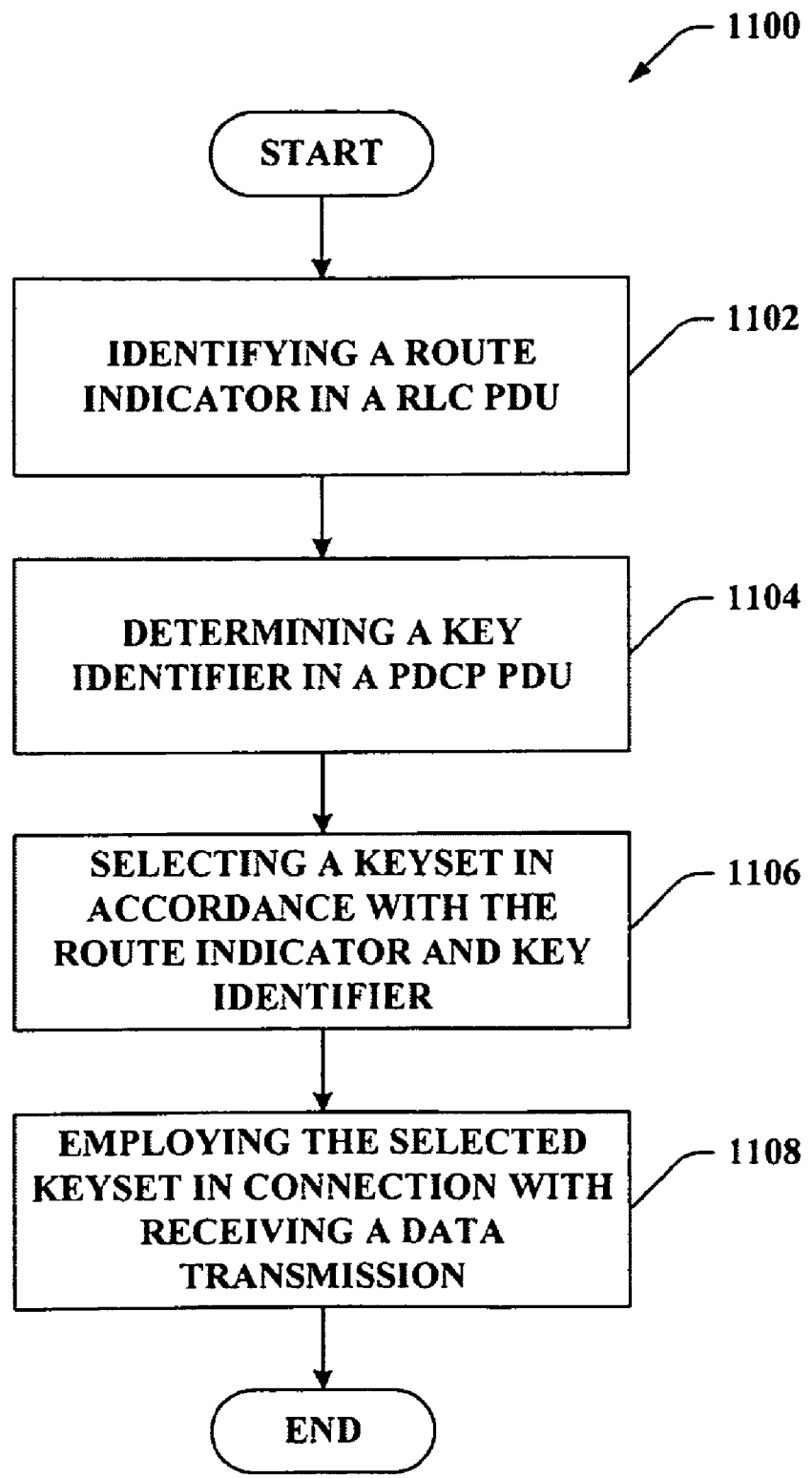
FIG. 11 is an illustration of an example methodology that facilitates determining a keyset utilized with a data transmission in order to receive the transmission.

Turning to FIG. 11, illustrated is a methodology 1100 that facilitates determining a keyset utilized with a data transmission in order to receive the transmission. In particular, method 1100 can be employed to receive a data transmission in a wireless communications network configured to include multiple radio link controls (e.g., RLC does not reset and is forwarded upon handover). At reference numeral 1102, a route indicator in a RLC protocol data unit (PDU) is identified. Pursuant to an illustration, the route indicator can specify a first route or a second route wherein a route is associated with a particular base station or cell. Accordingly, in handover situations, the route indicator can distinguish a source cell from a target cell. At reference numeral 1004, a key identifier in a packet data convergence protocol PDU is determined. The key identifier can specify one of at least two keysets associated with the identified route indicator. At reference numeral 1106, a keyset is selected in accordance with the route indicator and key identifier. For example, the route indicator can narrow a plurality of keysets into a particular subset and the key identifier can pick a particular keyset from the subset. At reference numeral 1108, the selected keyset is employed in connection with receiving a data transmission. For instance, the data transmission can be ciphered or integrity protected. At least one key from the selected keyset can be utilized to decipher the data and/or verify integrity.

Figure 12:
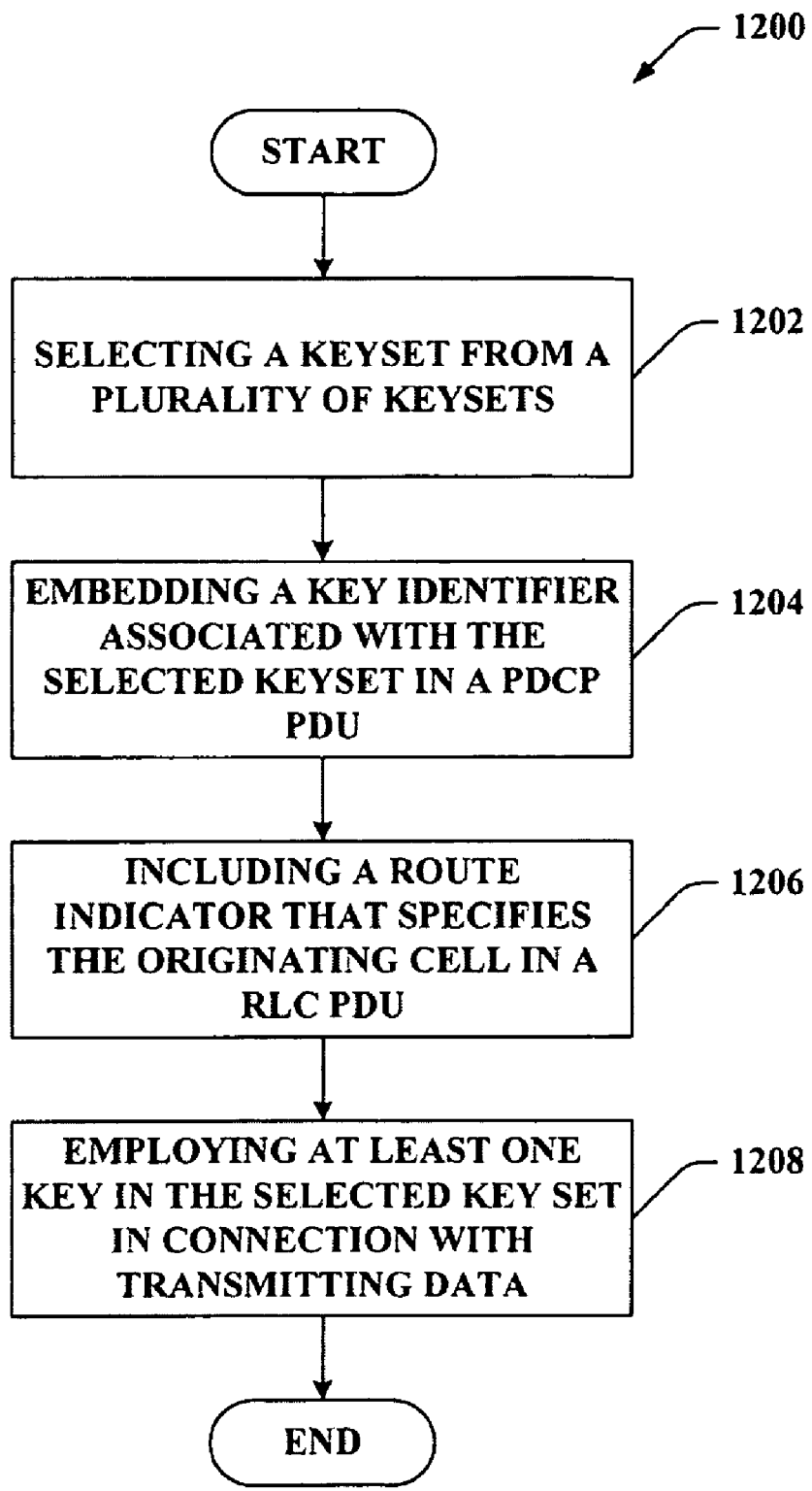
FIG. 12 is an illustration of an example methodology that facilitates identifying a keyset employed to transmit data.

Referring now to FIG. 12, illustrated is a methodology 1200 that facilitates identifying a keyset employed to transmit data. In particular, method 1200 can be employed to transmit data in a wireless communications network configured to include multiple radio link controls. At reference numeral 1202, a keyset is selected from a plurality of keysets. At reference numeral 1204, a key identifier associated with the selected keyset is embedded in a packet data convergence protocol (PDCP) protocol data unit (PDU). The key identifier specifies one of at least two keysets. At reference numeral 1206, a route indicator that specifies an originating cell is included in a radio link control (RLC) PDU. The route indicator provides additional identification of a keyset in handover situations to enable a receive to distinguish between a keyset from a source cell and a keyset from a target cell. At reference numeral 1208, at least one key in the selected keyset is employed in connection with transmitting data associated with the PDCP PDUs and RLC PDUs. For example, the at least one key can be a ciphering key or an integrity key.

Figure 13:
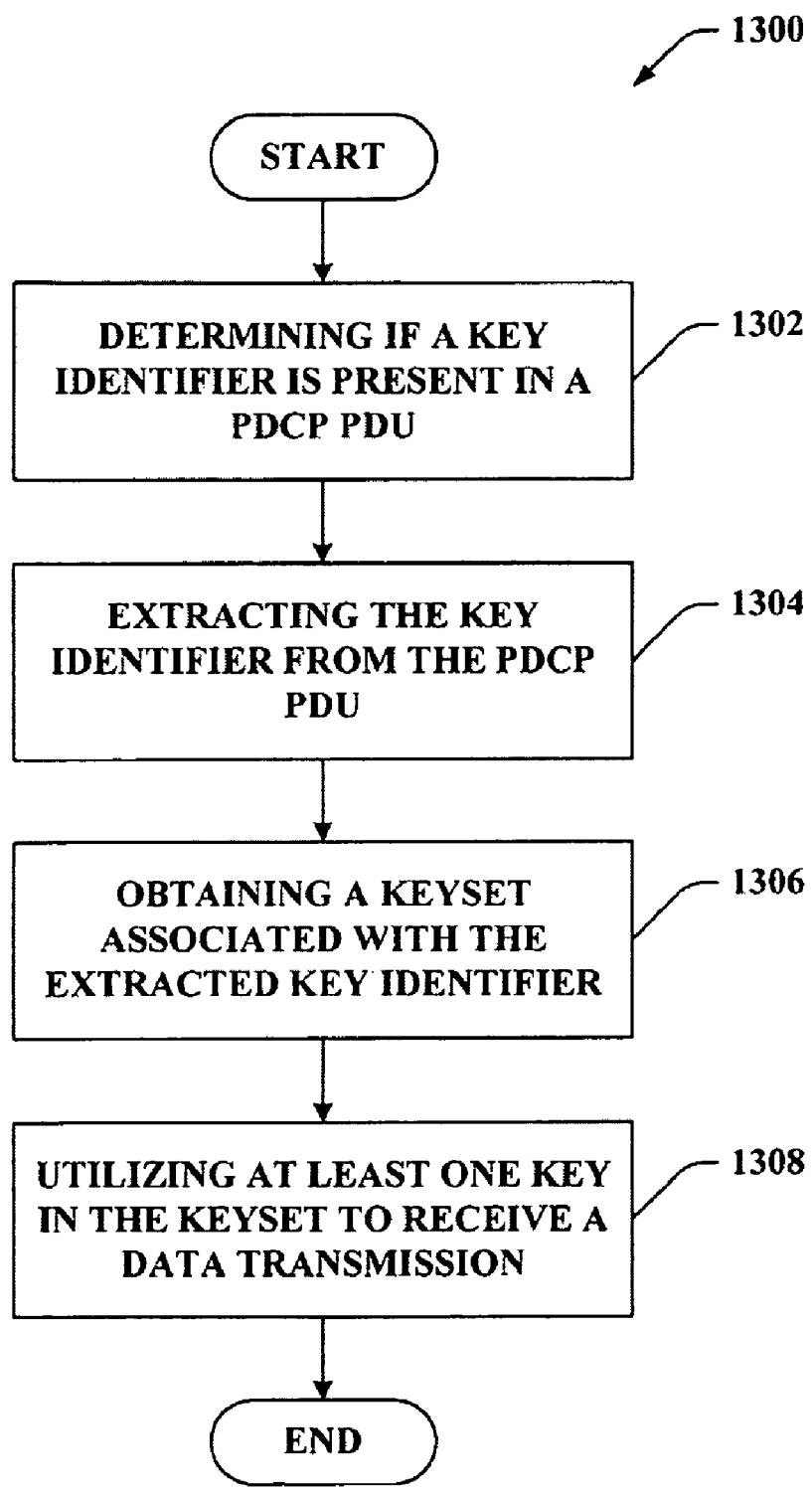
FIG. 13 is an illustration of an example methodology that facilitates determining a keyset utilized with a data transmission in order to receive the transmission.

Turning to FIG. 13, illustrated is a methodology 1300 that facilitates determining a keyset utilized with a data transmission in order to receive the transmission. In particular, method 1300 can be employed to receive a data transmission in a wireless communications network configured to reset a radio link control. At reference numeral 1302, it is determined if a key identifier is present in a packet data convergence protocol (PDCP) data unit. For example, a presence indicator can notify whether a key identifier is appended to the data unit. At reference numeral 1304, a key identifier is extracted from the data unit, if present. The key identifier can fully describe a keyset utilized to decrypt and/or integrity protect data even in handover situations with at least three keysets in active use. At reference numeral 1306, a keyset is selected in accordance with the key identifier. For example, the key indicator can provide an index to a table of keysets or routines employable to generate a keyset. At reference numeral 1208, at least one key in the selected keyset is utilized to receive a data transmission. For instance, the data transmission can be ciphered or integrity protected. The at least one key can be a ciphering key or an integrity key.

Figure 14:
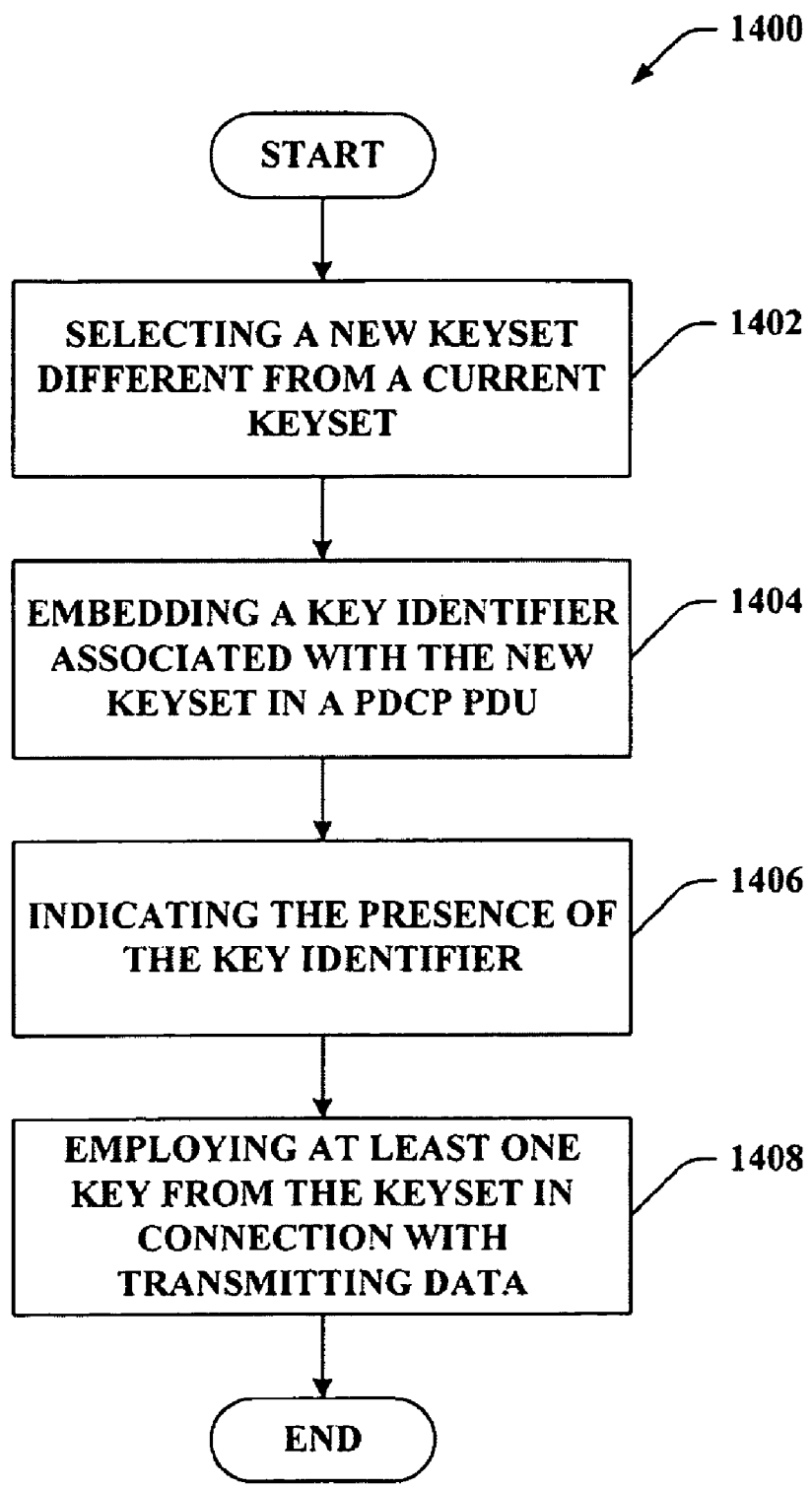
FIG. 14 is an illustration of an example methodology that facilitates identifying a keyset employed to transmit data.

Referring now to FIG. 14, illustrated is a methodology 1400 that facilitates identifying a keyset employed to transmit data. In particular, method 1400 can be employed to transmit data in a wireless communications network configured to reset a radio link control. At reference numeral 1402, a new keyset is selected from a plurality of keysets that is different than a current keyset. At reference numeral 1204, a key identifier associated with the selected keyset is embedded in a packet data convergence protocol (PDCP) protocol data unit (PDU). The key identifier specifies one of at least four keysets. At reference numeral 1206, a presence of the key identifier in the PDCP PDU is indicated. For example, a data bit can be utilize to distinguish when a key identifier is appended to a PDU and when it is not. At reference numeral 1408, at least one key in the selected keyset is employed in connection with transmitting data associated with the PDCP PDUs. For example, the at least one key can be a ciphering key or an integrity key.

It will be appreciated that, in accordance with one or more aspects described herein, inferences can be made regarding evaluating data units for key identification information, selecting keysets, initiating re-keying procedures, initiating handovers, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 15:
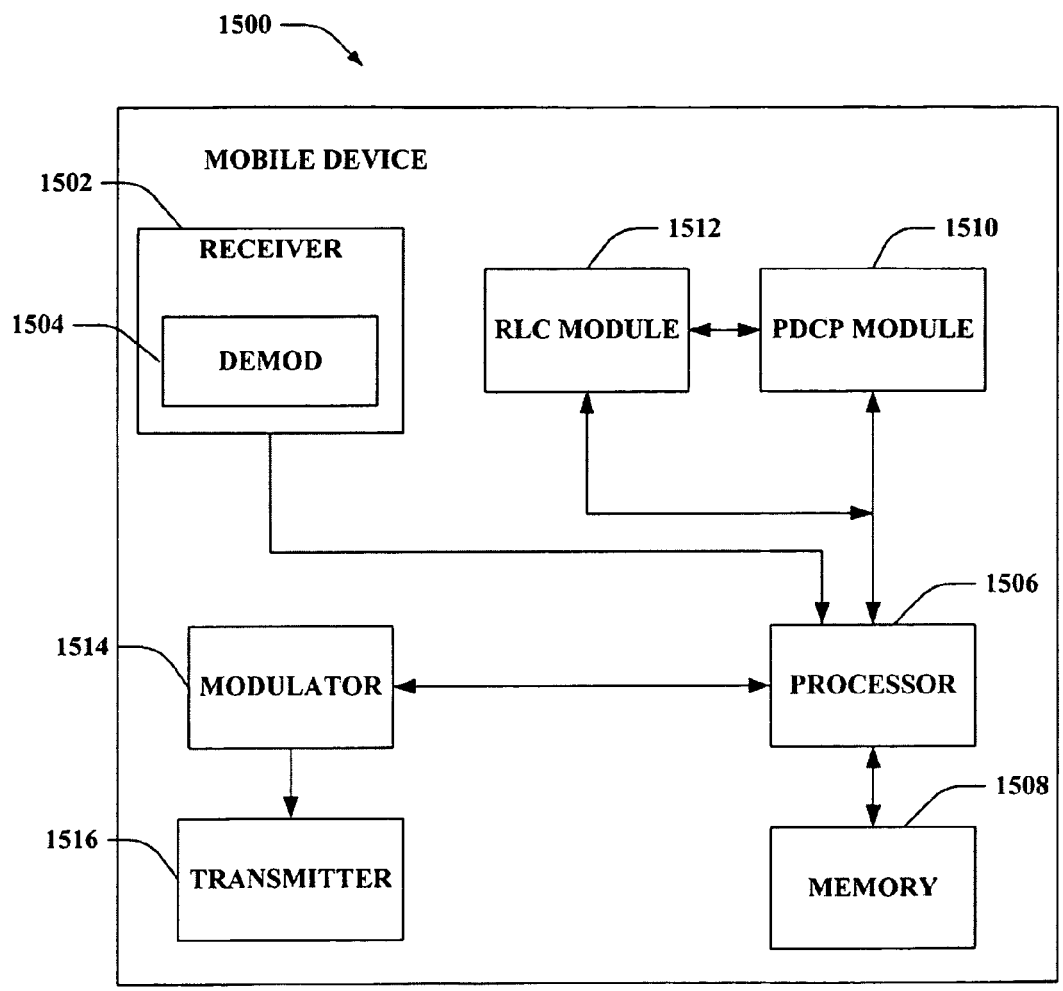
FIG. 15 is an illustration of an example system that facilitates identifying a keyset employed in a data transmission.

FIG. 15 is an illustration of a mobile device 1500 that facilitates that facilitates identifying a keyset employed in a data transmission. Mobile device 1500 comprises a receiver 1502 that receives a signal from, for instance, a receive antenna (not shown), performs typical actions on (e.g., filters, amplifies, downconverts, etc.) the received signal, and digitizes the conditioned signal to obtain samples. Receiver 1502 can comprise a demodulator 1504 that can demodulate received symbols and provide them to a processor 1506 for channel estimation. Processor 1506 can be a processor dedicated to analyzing information received by receiver 1502 and/or generating information for transmission by a transmitter 1516, a processor that controls one or more components of mobile device 1500, and/or a processor that both analyzes information received by receiver 1502, generates information for transmission by transmitter 1516, and controls one or more components of mobile device 1500.

Mobile device 1500 can additionally comprise memory 1508 that is operatively coupled to processor 1506 and that can store data to be transmitted, received data, information related to available channels, data associated with analyzed signal and/or interference strength, information related to an assigned channel, power, rate, or the like, and any other suitable information for estimating a channel and communicating via the channel. Memory 1508 can additionally store protocols and/or algorithms associated with estimating and/or utilizing a channel (e.g., performance based, capacity based, etc.). Further, memory 1508 can retain prioritized bit rates, maximum bit rates, queue sizes, etc., related to one or more bearers serviced by the mobile device 1500.

It will be appreciated that the data store (e.g., memory 1508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The memory 1508 of the subject systems and methods is intended to comprise, without being limited to, these and any other suitable types of memory.

Processor 1506 can be operatively coupled to PDCP module 1510 that can manage the PDCP layer in wireless communications. In particular, the PDCP module 1510 can generate and/or analyze protocol data units (PDUs) associated with the PDCP layer to establish and/or ascertain keyset information. For instance, the PDCP module 1510 can encode information into a PDU associated with a data transmission to a base station wherein the encoded information specifies a keyset utilized to cipher the data and/or provide integrity protection. In addition, the PDCP module 1510 can analyze a received PDCP PDU from a base station to determine a keyset employed by the base station.

Processor 1506 can further be coupled to a RLC module 1512. In wireless communications networks configured with multiple RLCs (e.g., RLC does not reset on handover), the RLC module 1512 can facilitate identifying a keyset. For example, the wireless communications network can be configured to forward RLC PDUs in handover situations in addition to PDCP PDUs. Accordingly, the RLC module 1512 can generate a PDU that includes a route indicator that specifies whether the keyset information in the PDCP PDU corresponds to a source base station or a target base station of a handover. Mobile device 1500 still further comprises a modulator 1514 and transmitter 1516 that respectively modulate and transmit signals to, for instance, a base station, another mobile device, etc. Although depicted as being separate from the processor 1506, it is to be appreciated that the PDCP module 1510, RLC module 1512, demodulator 1504, and/or modulator 1514 can be part of the processor 1506 or multiple processors (not shown).

Figure 16:
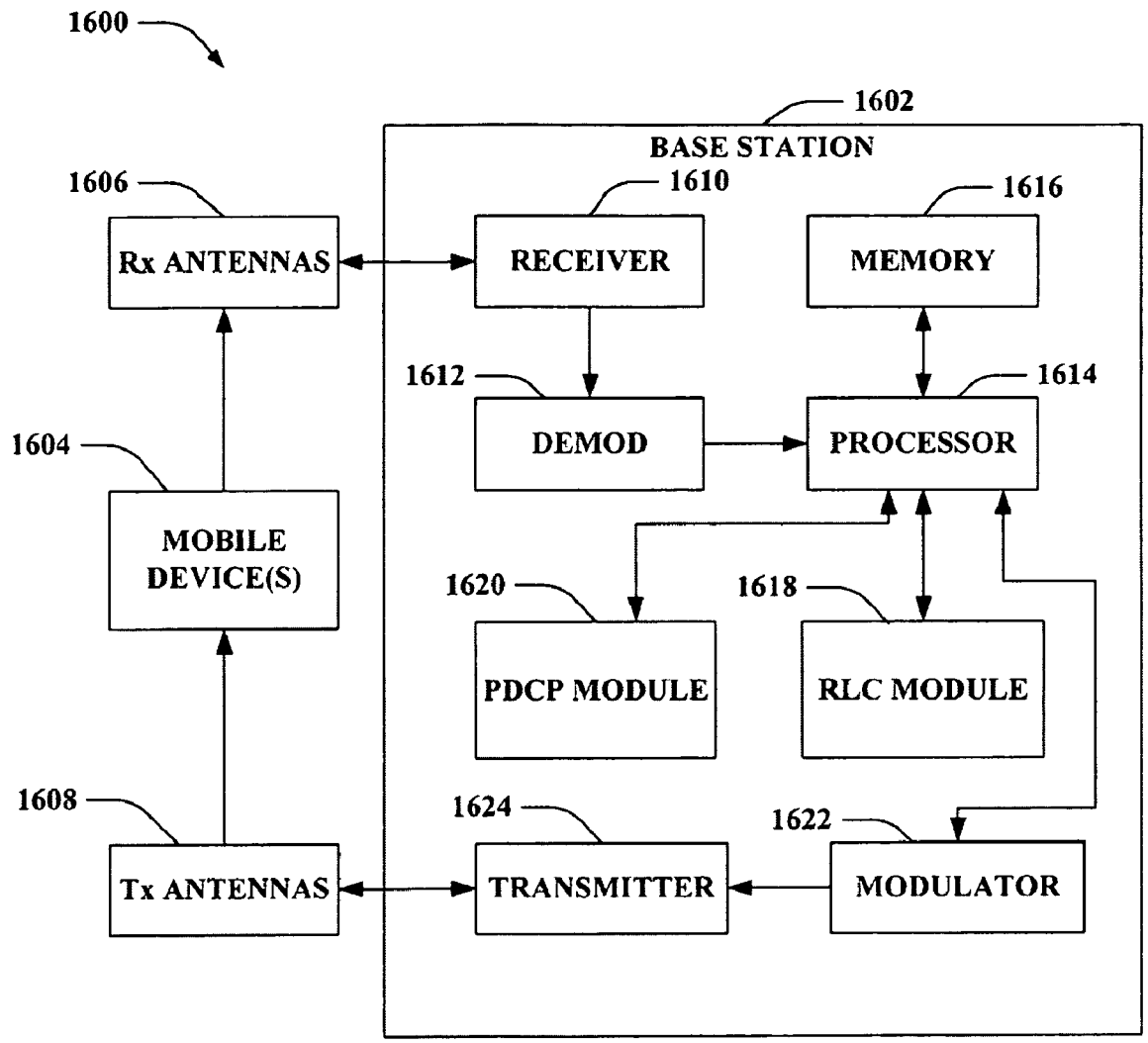
FIG. 16 is an illustration of an example system that facilitates utilizing a plurality of keysets in a wireless communications system.

FIG. 16 is an illustration of a system 1600 that facilitates utilizing a plurality of keysets in a wireless communications system. The system 1600 comprises a base station 1602 (e.g., access point, . . . ) with a receiver 1610 that receives signal(s) from one or more mobile devices 1604 through a plurality of receive antennas 1606, and a transmitter 1624 that transmits to the one or more mobile devices 1604 through a transmit antenna 1608. Receiver 1610 can receive information from receive antennas 1606 and is operatively associated with a demodulator 1612 that demodulates received information. Demodulated symbols are analyzed by a processor 1614 that can be similar to the processor described above with regard to FIG. 15, and which is coupled to a memory 1616 that stores information related to estimating a signal (e.g., pilot) strength and/or interference strength, data to be transmitted to or received from mobile device(s) 1604 (or a disparate base station (not shown)), and/or any other suitable information related to performing the various actions and functions set forth herein.

Processor 1614 can be a processor dedicated to analyzing information received by receiver 1610 and/or generating information for transmission by a transmitter 1624, a processor that controls one or more components of base station 1602, and/or a processor that both analyzes information received by receiver 1610, generates information for transmission by transmitter 1624, and controls one or more components of base station 1602.

Base station 1602 can additionally comprise memory 1616 that is operatively coupled to processor 1614 and that can store data to be transmitted, received data, information related to available channels, data associated with analyzed signal and/or interference strength, information related to an assigned channel, power, rate, or the like, and any other suitable information for estimating a channel and communicating via the channel. Memory 1616 can additionally store protocols and/or algorithms associated with estimating and/or utilizing a channel (e.g., performance based, capacity based, etc.).

It will be appreciated that the memory 1616 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1608 of the subject systems and methods is intended to comprise, without being limited to, these and any other suitable types of memory.

Processor 1614 is further coupled PDCP module 1620 that can manage the PDCP layer in wireless communications. In particular, the PDCP module 1620 can generate and/or analyze protocol data units (PDUs) associated with the PDCP layer to establish and/or ascertain keyset information. For instance, the PDCP module 1620 can encode information into a PDU associated with a data transmission to mobile device 1604 wherein the encoded information specifies a keyset utilized to cipher the data and/or provide integrity protection. In addition, the PDCP module 1620 can analyze received PDCP PDUs from mobile device 1604 to determine a keyset employed by the base station.

Processor 1614 can further be coupled to a RLC module 1618. In wireless communications networks configured with multiple RLCs (e.g., RLC does not reset on handover), the RLC module 1618 can facilitate identifying a keyset. For example, the wireless communications network can be configured to forward RLC PDUs in handover situations in addition to PDCP PDUs. Accordingly, the RLC module 1618 can generate a PDU that includes a route indicator that specifies whether the keyset information in the PDCP PDU corresponds to a source base station or a target base station of a handover. Base station 1602 further comprises a modulator 1622 that modulate signals that can be transmitted by transmitter 1624 to, for instance, mobile device 1604. Furthermore, although depicted as being separate from the processor 1614, it is to be appreciated that the RLC module 1618, PDPC module 1620, demodulator 1612, and/or modulator 1622 can be part of the processor 1614 or multiple processors (not shown).

Figure 17:
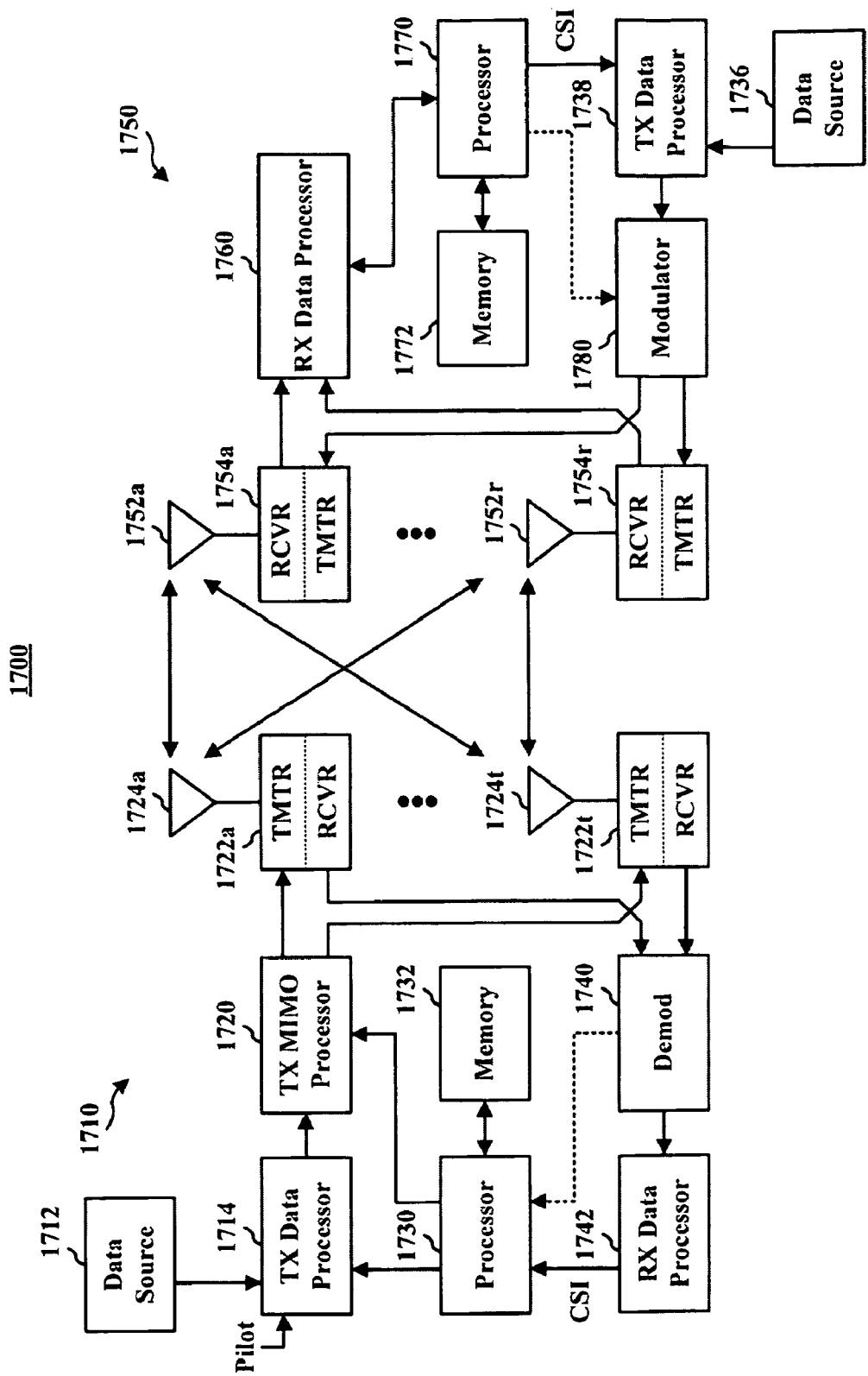
FIG. 17 is an illustration of an example wireless network environment that can be employed in conjunction with the various systems and methods described herein.

FIG. 17 shows an example wireless communication system 1700. The wireless communication system 1700 depicts one base station 1710 and one mobile device 1750 for sake of brevity. However, it is to be appreciated that system 1700 can include more than one base station and/or more than one mobile device, wherein additional base stations and/or mobile devices can be substantially similar or different from example base station 1710 and mobile device 1750 described below. In addition, it is to be appreciated that base station 1710 and/or mobile device 1750 can employ the systems (FIGS. 1-4 and 15-16), examples (FIGS. 5-10) and/or methods (FIGS. 11-14) described herein to facilitate wireless communication there between.

At base station 1710, traffic data for a number of data streams is provided from a data source 1712 to a transmit (TX) data processor 1714. According to an example, each data stream can be transmitted over a respective antenna. TX data processor 1714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1750 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1730.

The modulation symbols for the data streams can be provided to a TX MIMO processor 1720, which can further process the modulation symbols (e.g., for OFDM). TX MIMO processor 1720 then provides $N_T$ modulation symbol streams to $N_T$ transmitters (TMTR) 1722a through 1722t. In various embodiments, TX MIMO processor 1720 applies beamforming weights to the symbols of the data streams and to the antenna from which the symbol is being transmitted.

Each transmitter 1722 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1722a through 1722t are transmitted from $N_T$ antennas 1724a through 1724t, respectively.

At mobile device 1750, the transmitted modulated signals are received by $N_R$ antennas 1752a through 1752r and the received signal from each antenna 1752 is provided to a respective receiver (RCVR) 1754a through 1754r. Each receiver 1754 conditions (e.g., filters, amplifies, and downconverts) a respective signal, digitizes the conditioned signal to provide samples, and further processes the samples to provide a corresponding "received" symbol stream.

An RX data processor 1760 can receive and process the $N_R$ received symbol streams from $N_R$ receivers 1754 based on a particular receiver processing technique to provide $N_T$ "detected" symbol streams. RX data processor 1760 can demodulate, deinterleave, and decode each detected symbol stream to recover the traffic data for the data stream. The processing by RX data processor 1760 is complementary to that performed by TX MIMO processor 1720 and TX data processor 1714 at base station 1710.

A processor 1770 can periodically determine which preceding matrix to utilize as discussed above. Further, processor 1770 can formulate a reverse link message comprising a matrix index portion and a rank value portion.

The reverse link message can comprise various types of information regarding the communication link and/or the received data stream. The reverse link message can be processed by a TX data processor 1738, which also receives traffic data for a number of data streams from a data source 1736, modulated by a modulator 1780, conditioned by transmitters 1754a through 1754r, and transmitted back to base station 1710.

At base station 1710, the modulated signals from mobile device 1750 are received by antennas 1724, conditioned by receivers 1722, demodulated by a demodulator 1740, and processed by a RX data processor 1742 to extract the reverse link message transmitted by mobile device 1750. Further, processor 1730 can process the extracted message to determine which precoding matrix to use for determining the beamforming weights.

Processors 1730 and 1770 can direct (e.g., control, coordinate, manage, etc.) operation at base station 1710 and mobile device 1750, respectively. Respective processors 1730 and 1770 can be associated with memory 1732 and 1772 that store program codes and data. Processors 1730 and 1770 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 18:
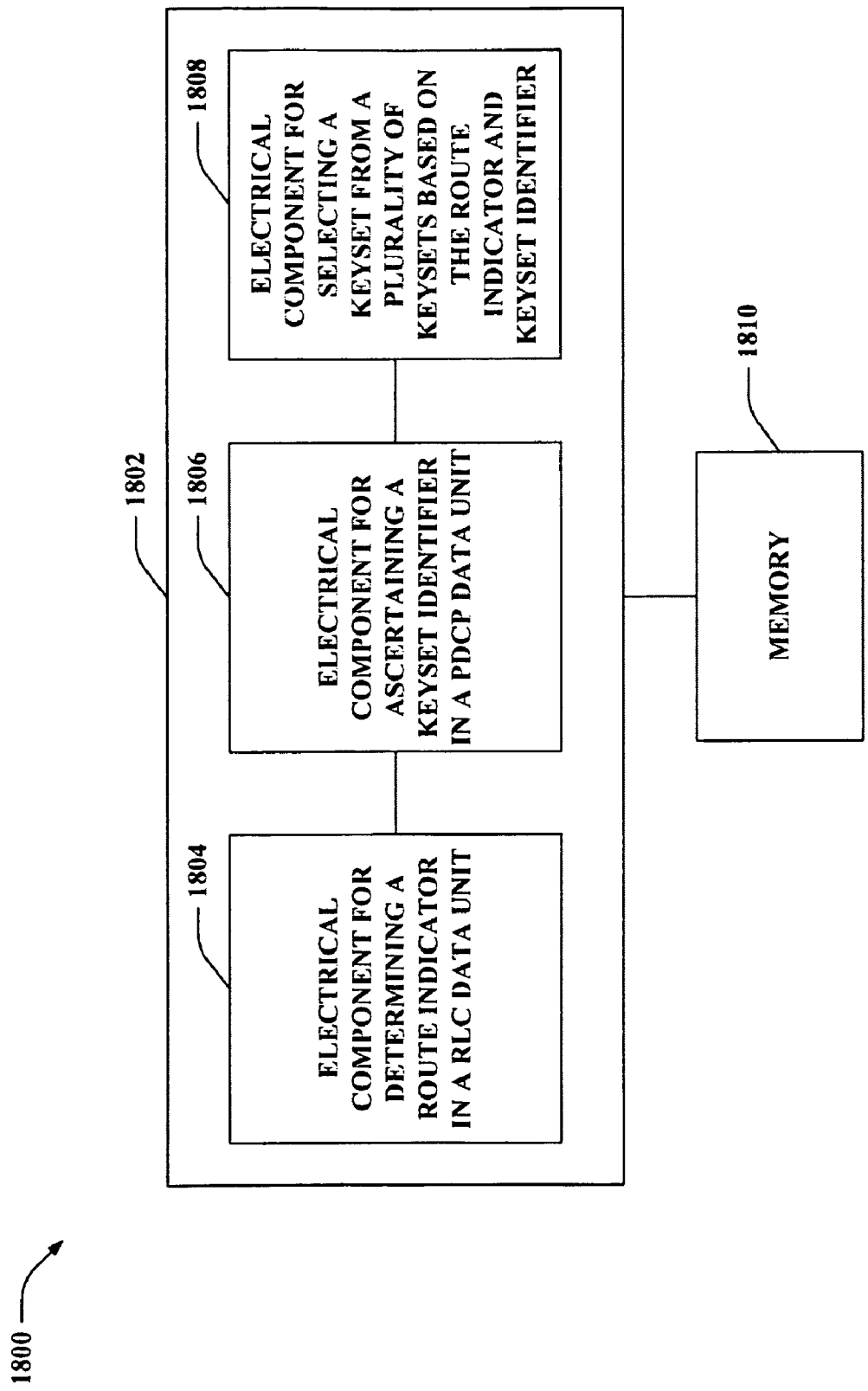
FIG. 18 is an illustration of an example system that identifies a keyset utilized in a data transmission.

With reference to FIG. 18, illustrated is a system 1800 that identifies a keyset utilized in a data transmission. For example, system 1800 can reside at least partially within a base station, mobile device, etc. It is to be appreciated that system 1800 is represented as including functional blocks, which can be functional blocks that represent functions implemented by a processor, software, or combination thereof (e.g., firmware). System 1800 includes a logical grouping 1802 of electrical components that can act in conjunction. For instance, logical grouping 1802 can include an electrical component for determining a route indicator in a RLC data unit 1804. Further, logical grouping 1802 can comprise an electrical component for ascertaining a keyset identifier in a PDCP data unit 1806. Moreover, logical grouping 1802 can comprise an electrical component for selecting a keyset from a plurality of keysets based on the route indicator and keyset identifier 1808. Additionally, system 1800 can include a memory 1810 that retains instructions for executing functions associated with electrical components 1804, 1806, and 1808. While shown as being external to memory 1810, it is to be understood that one or more of electrical components 1804, 1806, and 1808 can exist within memory 1810.

Figure 19:
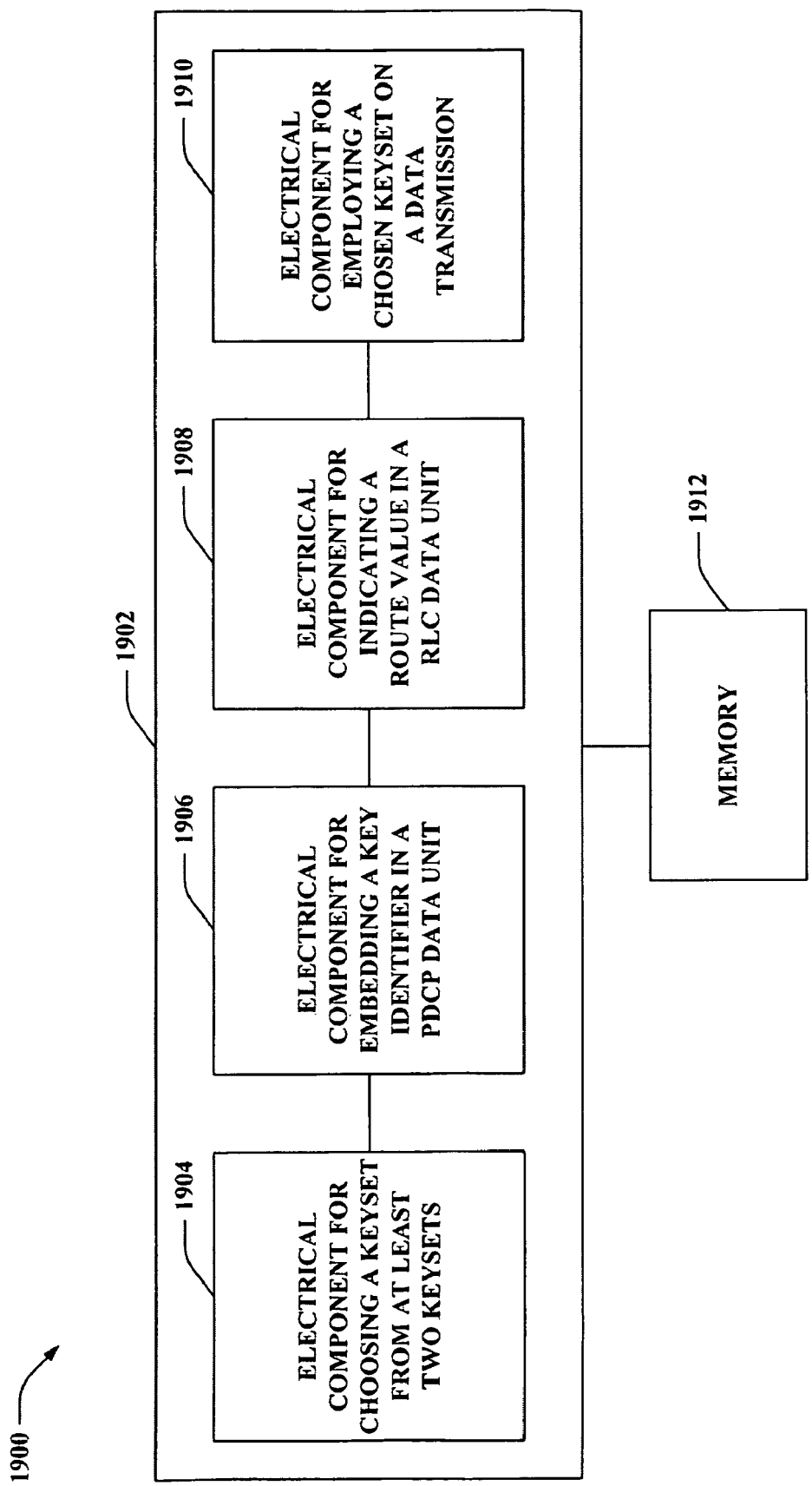
FIG. 19 is an illustration of an example system that facilitates specifying a keyset from a plurality of keyset employed in a transmission.

With reference to FIG. 19, illustrated is a system 1900 that facilitates specifying a keyset from a plurality of keyset employed in a transmission. For example, system 1900 can reside at least partially within a base station, mobile device, etc. It is to be appreciated that system 1900 is represented as including functional blocks, which can be functional blocks that represent functions implemented by a processor, software, or combination thereof (e.g., firmware). System 1900 includes a logical grouping 1902 of electrical components that can act in conjunction. For instance, logical grouping 1902 can include an electrical component for choosing a keyset from at least two keysets 1904. Further, logical grouping 1902 can comprise an electrical component for embedding a key identifier in a PDCP data unit 1906. Moreover, logical grouping 1902 can comprise an electrical component for indicating a route value in a RLC data unit 1908. In addition, logical grouping 1902 can include an electrical component for employing a chosen keyset on a data transmission 1910. Additionally, system 1900 can include a memory 1912 that retains instructions for executing functions associated with electrical components 1904, 1906, 1908 and 1910. While shown as being external to memory 1912, it is to be understood that one or more of electrical components 1904, 1906, 1908 and 1910 can exist within memory 1912.

Figure 20:
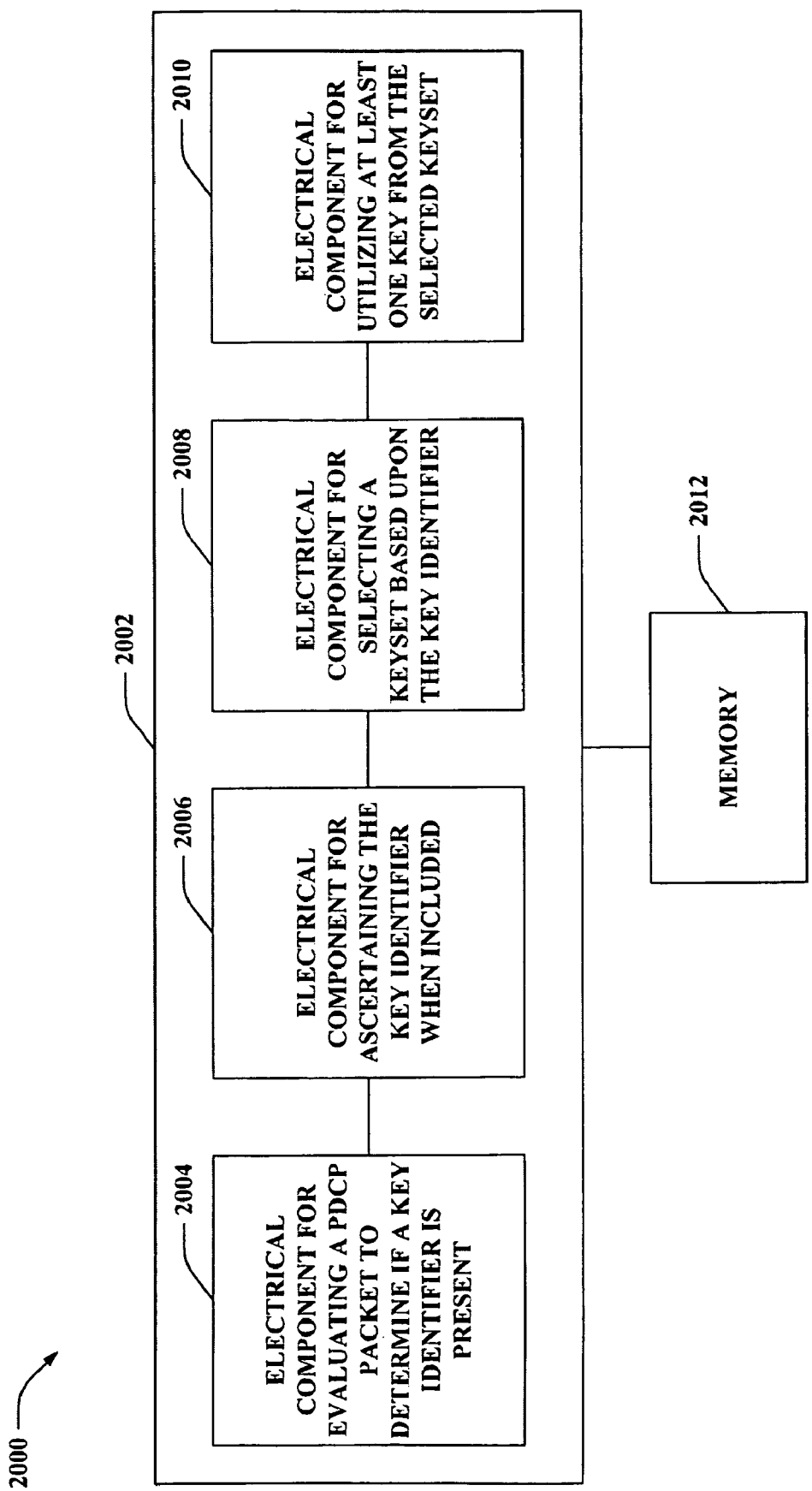
FIG. 20 is an illustration of an example system that identifies a keyset utilized in a data transmission.

With reference to FIG. 20, illustrated is a system 2000 that identifies a keyset utilized in a data transmission. For example, system 2000 can reside at least partially within a base station, mobile device, etc. It is to be appreciated that system 2000 is represented as including functional blocks, which can be functional blocks that represent functions implemented by a processor, software, or combination thereof (e.g., firmware). System 2000 includes a logical grouping 2002 of electrical components that can act in conjunction. For instance, logical grouping 2002 can include an electrical component for evaluating a PDCP packet to determine if a key identifier is present 2004. Further, logical grouping 2002 can comprise an electrical component for ascertaining the key identifier when included 2006. Moreover, logical grouping 2002 can comprise an electrical component for selecting a keyset based upon the key identifier 2008. In addition, logical grouping 2002 can include an electrical component for utilizing at least one key from the selected keyset 2010. Additionally, system 2000 can include a memory 2012 that retains instructions for executing functions associated with electrical components 2004, 2006, 2008 and 2010. While shown as being external to memory 2012, it is to be understood that one or more of electrical components 2004, 2006, 2008 and 2010 can exist within memory 2012.

Figure 21:
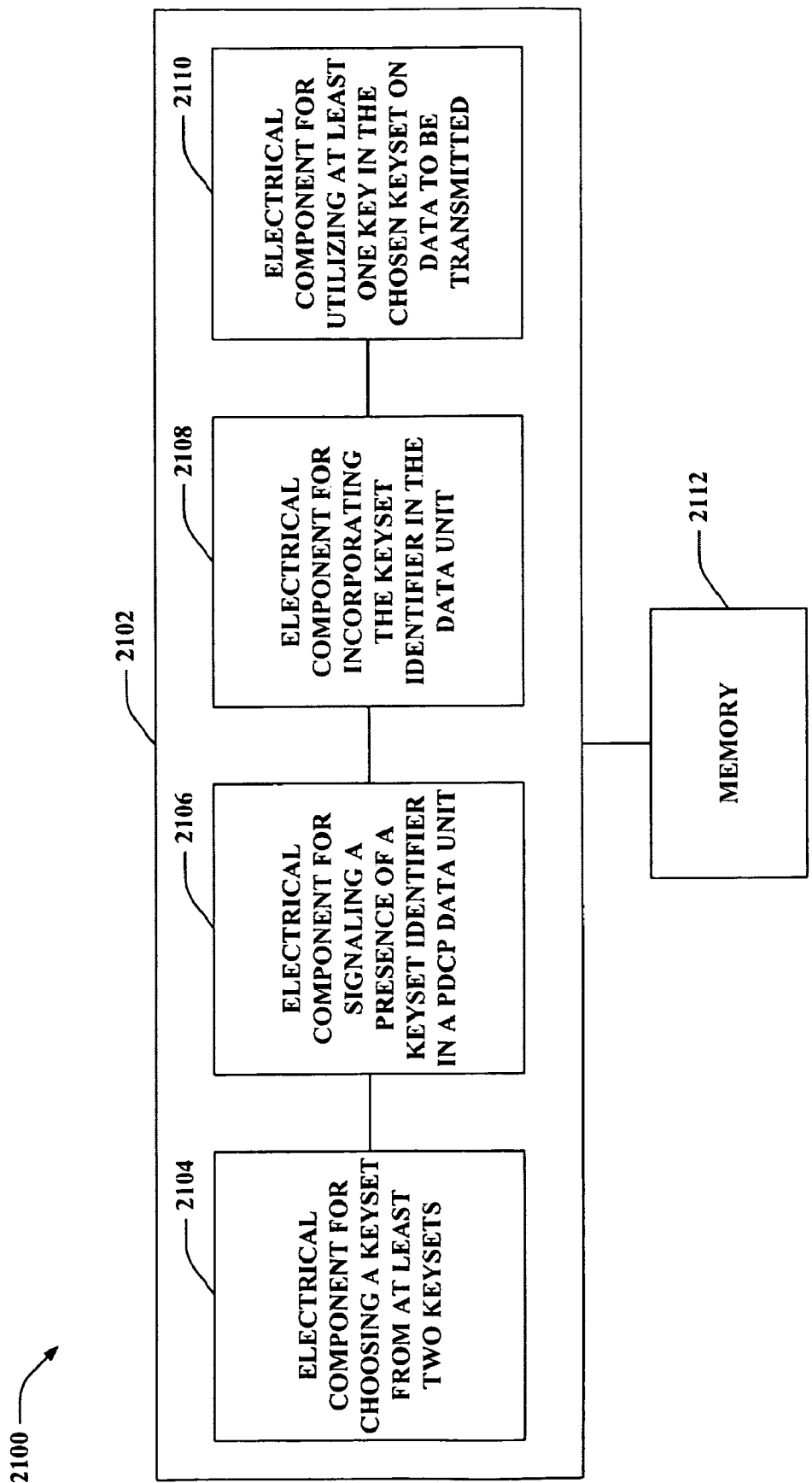
FIG. 21 is an illustration of an example system that facilitates specifying a keyset from a plurality of keyset employed in a transmission.

With reference to FIG. 21, illustrated is a system 2100 that facilitates specifying a keyset from a plurality of keyset employed in a transmission. For example, system 2100 can reside at least partially within a base station, mobile device, etc. It is to be appreciated that system 2100 is represented as including functional blocks, which can be functional blocks that represent functions implemented by a processor, software, or combination thereof (e.g., firmware). System 2100 includes a logical grouping 2102 of electrical components that can act in conjunction. For instance, logical grouping 2102 can include an electrical component for choosing a keyset from at least two keysets 2104. Further, logical grouping 2102 can comprise an electrical component for signaling a presence of a keyset identifier in a PDCP data unit 2106. Moreover, logical grouping 2102 can comprise an electrical component for incorporating the keyset identifier in the data unit 2108. In addition, logical grouping 2102 can include an electrical component for utilizing at least one key in the chosen keyset on data to be transmitted2110. Additionally, system 2100 can include a memory 2112 that retains instructions for executing functions associated with electrical components 2104, 2106, 2108 and 21 10. While shown as being external to memory 2112, it is to be understood that one or more of electrical components 2104, 2106, 2108 and 2110 can exist within memory 2112.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates identifying a keyset utilized in data communications, comprising:
    identifying a route indicator included in a radio link control (RLC) protocol data unit, wherein the route indicator specifies at least one of a source cell or a target cell;
    detecting a key identifier in a packet data convergence protocol (PDCP) data unit, wherein the key identifier identifies at least two keysets actively utilized in communications;
    selecting a keyset from a plurality of keysets, in accordance with an index determined at least in part based on the route indicator and key identifier; and
    employing at least one key in the selected keyset in connection with receiving a data transmission.

2. The method of claim 1, wherein the at least one key is a ciphering key that decodes the data transmission.

3. The method of claim 1, wherein the at least one key is an integrity key that verifies integrity of the data transmission.

4. The method of claim 1, wherein the route indicator is a bit.

5. The method of claim 4, wherein a route indicator value of zero specifies the source cell.

6. The method of claim 4, wherein a route indicator value of one specifies the target cell.

7. The method of claim 1, further comprising receiving the RLC protocol data unit and the PDCP data unit as a forward from the source cell.

8. The method of claim 1, wherein the PDCP data unit is at least one of 8 bits in length or 16 bits in length.

9. The method of claim 1, further comprising:
    determining whether the PDCP data unit is a control data unit; and
    bypassing keyset determination for control data units.

10. A communications apparatus that facilitates utilizing a plurality of ciphering keys, comprising:
    means for determining a route indicator in a radio link control (RLC) data unit, wherein the route indicator specifies at least one of a source cell or a target cell;
    means for ascertaining a keyset identifier in a packet data convergence protocol (PDCP) data unit, wherein the key identifier identifies at least two keysets actively utilized in communications; and
    means for selecting a keyset from a plurality of keysets in accordance with an index determined at least in part based on the route indicator and keyset identifier.

11. The communications apparatus of claim 10, further comprising means for employing at least one key in the selected keyset in connection with receiving a data transmission.

12. The communications apparatus of claim 11, wherein the at least one key is a ciphering key that decodes the data transmission.

13. The communications apparatus of claim 11, wherein the at least one key is an integrity key that verifies integrity of the data transmission.

14. The communications apparatus of claim 10, the route indicator identifies at least one of a source cell or a target cell.

15. A computer program product, comprising:
a non-transitory computer-readable medium comprising:
code for causing at least one computer to evaluate a radio link control (RLC) data unit to determine a route indicator, wherein the route indicator identifies at least one of a source cell or a target cell;
code for causing at least one computer to analyze a packet data convergence protocol (PDCP) data unit to ascertain a keyset identifier, wherein the keyset identifier specifies at least two keysets actively utilized in communications; and
code for causing at least one computer to select a keyset from a plurality of keysets in accordance with an index determined at least in part based on the route indicator and the keyset identifier.

16. The computer program product of claim 15, the non-transitory computer-readable medium further comprises code for causing at least one computer to employ at least one key in the selected keyset in connection with receiving a data transmission.

17. The computer program product of claim 16, wherein the at least one key is a ciphering key that decodes the data transmission.

18. The computer program product of claim 16, wherein the at least one key is an integrity key that verifies integrity of the data transmission.

19. A wireless communications apparatus, comprising:
a memory that retains instructions related to:
analyzing a radio link control (RLC) packet to ascertain a route indicator, wherein the route indicator specifies at least one of a source cell or a target cell,
evaluating a packet data convergence protocol (PDCP) data unit to determine a key identifier, wherein the key identifier identifies at least two keysets actively utilized in communications, and
choosing a keyset from a plurality of keysets in accordance with an index determined at least in part based on the route indicator and the keyset identifier; and
a processor, coupled to the memory, configured to execute the instructions retained in the memory.

20. The wireless communications apparatus of claim 19, further comprising the memory retaining instructions related to employing at least one key in the chosen keyset in connection with receiving a data transmission.

* * * * *